United States Patent
Walters et al.

(10) Patent No.: US 11,030,484 B2
(45) Date of Patent: Jun. 8, 2021

(54) SYSTEM AND METHOD FOR EFFICIENT GENERATION OF MACHINE-LEARNING MODELS

(71) Applicant: Capital One Services, LLC, McLean, VA (US)

(72) Inventors: Austin Walters, Savoy, IL (US); Jeremy Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/361,596

(22) Filed: Mar. 22, 2019

(65) Prior Publication Data
US 2020/0302234 A1    Sep. 24, 2020

(51) Int. Cl.
*G06K 9/62* (2006.01)
*G06F 9/54* (2006.01)
(Continued)

(52) U.S. Cl.
CPC .......... *G06K 9/6257* (2013.01); *G06F 9/542* (2013.01); *G06F 16/9035* (2019.01);
(Continued)

(58) Field of Classification Search
CPC .......................... G06K 9/6257; G06K 9/6276; G06F 16/9035; G06F 9/542; G06N 20/00
See application file for complete search history.

(56) References Cited

U.S. PATENT DOCUMENTS 9,213,943 B2    12/2015    Vladislav et al.
2010/0280979 A1    11/2010    Raaijmakers
(Continued)

FOREIGN PATENT DOCUMENTS

EP    1986139 A1    10/2008

OTHER PUBLICATIONS

Marinaki ("A Comparison of Several Nearest Neighbor Classifier Metrics using Tabu Search Algorithm for the Feature Selection Problem", Optimization Letters (2008) 2:299-308, 2008, pp. 299-308) (Year: 2008).*

(Continued)

*Primary Examiner* — Kakali Chaki
*Assistant Examiner* — Robert Lewis Kulp
(74) *Attorney, Agent, or Firm* — Finnegan, Henderson, Farabow, Garrett & Dunner LLP

(57) ABSTRACT

A system for determining data requirements to generate machine-learning models. The system may include one or more processors and one or more storage devices storing instructions. When executed, the instructions may configure the one or more processors to perform operations including: receiving a sample dataset, generating a plurality of data categories based on the sample dataset; generating a plurality of primary models of different model types using data from the corresponding one of the data categories as training data; generating a sequence of secondary models by training the corresponding one of the primary models with progressively less training data; identifying minimum viable models in the sequences of secondary models; determining a number of samples required for the minimum viable models; and generating entries in the database associating: model types; corresponding data categories; and corresponding numbers of samples in the training data used for the minimum viable models.

20 Claims, 14 Drawing Sheets

(51) Int. Cl.
  *G06N 20/00* (2019.01)
  *G06F 16/9035* (2019.01)
(52) U.S. Cl.
  CPC ........... *G06K 9/628* (2013.01); *G06K 9/6276* (2013.01); *G06N 20/00* (2019.01)

(56) References Cited

U.S. PATENT DOCUMENTS

| | | | | |
|---|---|---|---|---|
| 2014/0074614 | A1* | 3/2014 | Mehanian | G06Q 30/0267 |
| | | | | 705/14.64 |
| 2015/0379424 | A1* | 12/2015 | Dirac | G06N 20/00 |
| | | | | 706/12 |
| 2018/0018587 | A1* | 1/2018 | Kobayashi | G06N 5/04 |
| 2018/0225593 | A1* | 8/2018 | Cozine | G06N 20/00 |
| 2018/0240041 | A1 | 8/2018 | Koch et al. | |
| 2018/0341876 | A1* | 11/2018 | Ghosh | G06N 5/04 |
| 2019/0004920 | A1* | 1/2019 | Vandriessche | G06F 11/3447 |
| 2019/0122078 | A1* | 4/2019 | Ura | G06K 9/6257 |
| 2019/0236487 | A1* | 8/2019 | Huang | G06N 20/00 |

OTHER PUBLICATIONS

Walter Orth ("Multi-Period Credit Default Prediction—A Survival Analysis Approach", Dissertation, Universitat zu Koln, 2012, pp. 1-136) (Year: 2012).*

Zhang et al ("Market segmentation for product family positioning based on fuzzy clustering", Journal of Engineering Design, vol. 18, No. 3, Jun. 2007, pp. 227-241) (Year: 2007).*

Q. Zeng et al., Feature-guided clustering of multi-dimensional flow cytometry datasets, www.sciencedirect.com Journal of Biomedical Informatics 40 (2007) 325-331, 7 pages.

C. Finn et al., Model-Agnostic Meta-Learning for Fast Adaptation of Deep Networks, Proceedings of the 34th International Conference on Machine Learning, Sydney, Australia, PMLR 70, 2017.

Golovin et al., Google Vizier: A Service for Black-Box Optimization, Google Research Pittsburgh, PA, KDD '17, Aug. 13-17, 2017, ACM ISBN 978-1-4503-4887—Apr. 17, 2008.

* cited by examiner

SYSTEM AND METHOD FOR EFFICIENT GENERATION OF MACHINE-LEARNING MODELS

TECHNICAL FIELD

The present disclosure relates generally to systems and methods for generating machine-learning models, and more particularly, to systems that efficiently generate machine-learning models by estimating minimum data requirements for training models and tuning hyper-parameters.

BACKGROUND

In machine learning and artificial-intelligence modeling, training datasets are used to configure predictive and classification models. The modeling algorithms use the training datasets to adjust parameters in the models and tailor operations for prediction or classification tasks. This training process is governed by hyper-parameters that set basic elements of the model and are not directly related to the training data. For example, hyper-parameters may include the selected number of trees that govern the training of a random forest. Also, hyper-parameters may include the number of hidden layers that govern a neural network training.

Training a machine-learning model requires adjusting both parameters and hyper-parameters. For example, generating a predictive model normally involves selecting hyper-parameters, adjusting the model's parameters based on the training data, comparing the resulting prediction with validation data, evaluating the accuracy, and re-adjusting parameters until finding a configuration that results in a target accuracy. But determining parameters for a model is not sufficient to achieve a successful model. Tuning the hyper-parameters is a critical aspect of the model training process and mandatory for a machine-learning applications. To tune hyper-parameters, the whole training job is repeated multiple times with different hyper-parameters, attempting to maximize the aggregate accuracy by adjusting both parameters and hyper-parameters concurrently.

Tasks required to generate machine-learning models can be cumbersome and expensive. First, training the models is by itself computationally expensive because it normally requires processing large training datasets that include a myriad of data points. For example, processing tera- or petabytes of a training dataset, while adjusting values of the model, usually requires employing expensive parallel frameworks or super computers. Second, tuning hyper-parameters for a specific dataset also demands significant computing resources because tuning tasks require multiple iterations, thus potentially exponentiating computer expenses. Further, even when the iterations for tuning are distributed among multiple processing units, tuning processes still consume significant resources, take a long time, and create new complex challenges of resource allocation and process coordination.

Moreover, after training a model, users frequently realize computer resources were wasted because the model did not achieve the target accuracy or the model turned out to be "overfitted." A model is overfitted when the trained model is excessively complex, such as having too many parameters relative to the number of observations, and has a low predictive accuracy. The overfitted models result from training with an excessively large training sample or performing too many adjustment iterations. In these cases, the parameters of the model end up being too tightly correlated with the training dataset, resulting in a model that is incapable of working with new independent data. The overfitted model begins to simply memorize the training dataset without evaluating the general trend. Thus, significant computational resources are frequently wasted when the training process results in an overfitted model. An overfitted model not only consumes more resources than necessary, because it requires processing an excessively large training dataset and additional tuning iterations, but also frequently has a lower accuracy that forces users to restart the training process with alternative configurations.

The disclosed system and method for efficient generation of machine-learning and artificial-intelligence models address one or more of the problems set forth above and/or other problems in the prior art.

SUMMARY

One aspect of the present disclosure is directed to a system for determining data requirements to generate machine-learning models. The system may include one or more processors and one or more storage devices storing instructions. When executed, the instructions may configure the one or more processors to perform operations including: receiving, from a database, a sample dataset including a plurality of samples; generating a plurality of data categories based on the sample dataset, the data categories being associated with category data profiles; for each of the data categories, generating a plurality of primary models using data from the corresponding one of the data categories as training data, the primary models including different model types; for each of the primary models, generating a sequence of secondary models by training the corresponding one of the primary models with progressively less training data; identifying minimum viable models in the sequences of secondary models, the minimum viable models being models with a minimum amount of training data that achieve a threshold accuracy; determining a number of samples required for the minimum viable models; and generating entries in the database associating: model types of the minimum viable models; corresponding data categories of the minimum viable models; and corresponding numbers of samples in the training data used for the minimum viable models.

Another aspect of the present disclosure is directed to a non-transitory computer-readable medium storing instructions that, when executed by one or more processors, cause the one or more processors to perform operations. The operations may include receiving, from a database, a sample dataset including a plurality of samples; generating a plurality of data categories based on the sample dataset, the data categories being associated with category data profiles; for each of the data categories, generating a plurality of primary models using data from the corresponding one of the data categories as training data, the primary models including different model types; for each of the primary models, generating a sequence of secondary models by training the corresponding one of the primary models with progressively less training data; identifying minimum viable models in the sequences of secondary models, the minimum viable models being models with a minimum amount of training data that achieve a threshold accuracy; determining a number of samples required for the minimum viable models; and generating entries in the database associating: model types of the minimum viable models; corresponding data categories of the minimum viable models; and corresponding numbers of samples in the training data used for the minimum viable models.

Yet another aspect of the present disclosure is directed to a computer-implemented method for determining data requirements to generate machine-learning models. The method may include receiving, from a database, a sample dataset including a plurality of samples; generating a plurality of data categories based on the sample dataset, the data categories being associated with category data profiles; for each of the data categories, generating a plurality of primary models using data from the corresponding one of the data categories as training data, the primary models including different model types; for each of the primary models, generating a sequence of secondary models by training the corresponding one of the primary models with progressively less training data; identifying minimum viable models in the sequences of secondary models, the minimum viable models being models with a minimum amount of training data that meet a threshold accuracy; determining a number of samples required for the minimum viable models; and generating entries in the database associating: model types of the minimum viable models; corresponding data categories of the minimum viable models; and corresponding numbers of samples in the training data used for the minimum viable models.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
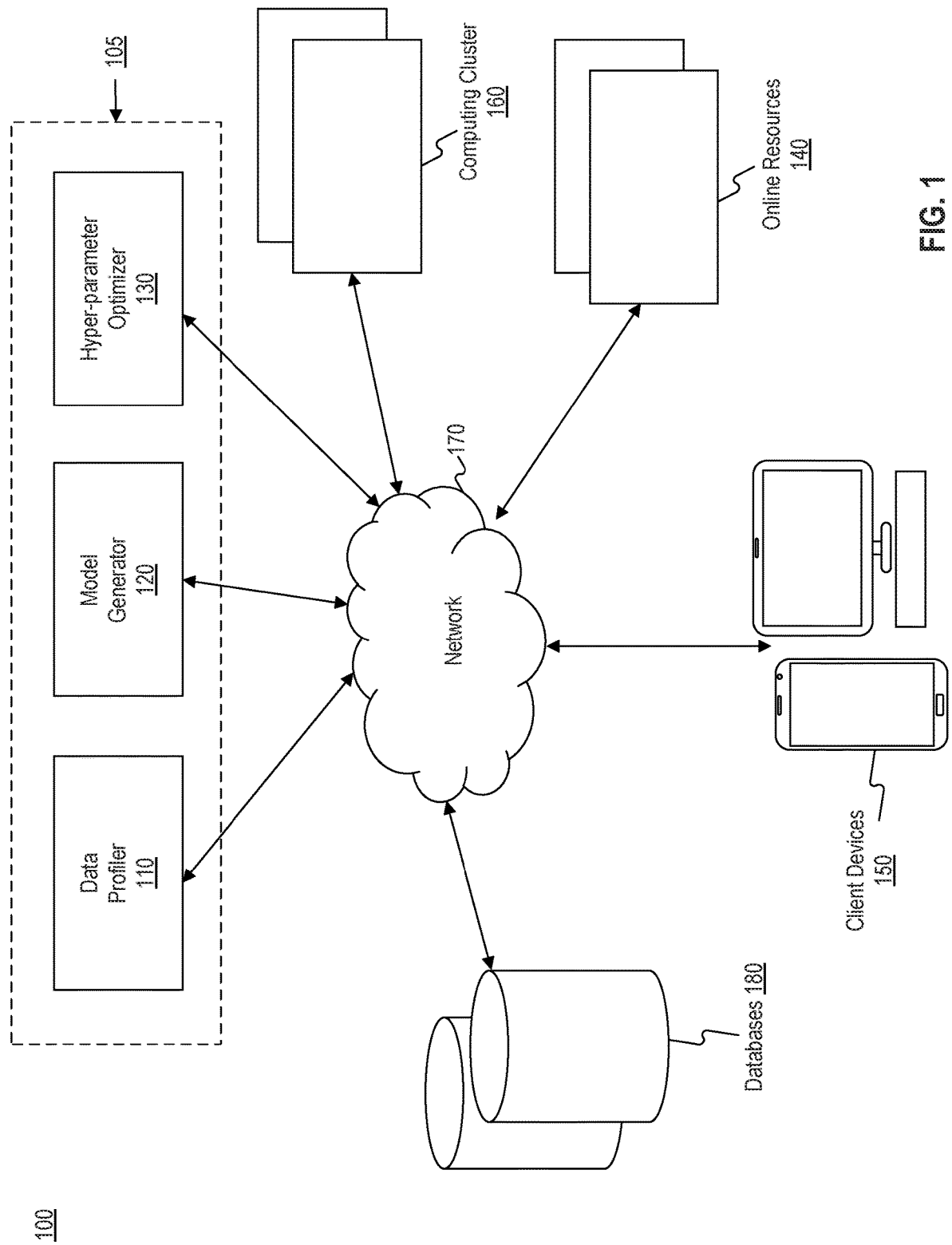
FIG. 1 is a block diagram of an exemplary system, consistent with disclosed embodiments.

The disclosure is generally directed to systems and methods for efficient generation of prediction and/or classification machine-learning algorithms. The disclosed systems and methods may improve the generation of models by estimating minimum data requirements for training and hyper-parameter tuning before the model is trained. In some embodiments, the system may estimate the minimum data requirements by creating a plurality of sample models with different datasets having different data profiles. From these sample models, the system may determine and store correlations between data profiles, target model types, tuned hyper-parameters, and minimum required number of samples (for training and/or validating), to achieve a target accuracy. Then, when a user is attempting to generate a new model using a new dataset, the system may identify a closely related data profile to estimate the minimum data requirements for the new model based on a sample model associated with the related data profile.

Estimating the minimum data requirements may reduce the amount of computing resources required for generation of the new model. For example, when the new dataset is larger than the minimum required number of samples, the new model may be generated using only a portion the user dataset. Limiting the dataset may avoid overprocessing of training data and may avert potential model overfitting. Further, with the lower number of samples the complexity of the model may be decreased (e.g., reduce the number of parameters), which may reduce resource consumption during hyper-parameter tuning or other optimization stages. Alternatively, the system may save resources by avoiding generating models that will not achieve a target accuracy because the training data is insufficient. The system may notify a user that the model is unlikely to reach the target accuracy with the available training data, preventing the consumption of resources in an unsuccessful model.

Moreover, in some embodiments the system may propose or recommend model types based on the user dataset. For example, the system may generate multiple types of sample models (including regressions, instance-based, clustering, and deep-learning models) and estimate minimum data requirements for each type of model. Then, based on a user dataset, the system may recommend a model type that achieves the target accuracy. Further, using the sample models the system may also facilitate the determination of hyper-parameters for new models. Because sample models may be trained with smaller datasets, sample models may be simpler and easier to optimize. Further, in some embodiments, the system may have the ability to correlate datasets based on their data profiles to make estimations based on similarity of training datasets. For example, the system may employ a series of statistical analysis to determine a data profile that is most closely related to the user data that is used to generate a new model. Then, the system may tune parameters and hyper-parameters using the configuration of the sample model, trained with a limited sample dataset but that has a similar data profile, and use the same or similar hyper-parameters for the new model. In this way, the system would minimize the cost of hyper-parameter tuning, thus further improving the efficiency of predictive model generation.

In some embodiments, the system may be easy for a user to operate, via a graphical user interface displayed in client devices. The graphical user interface may provide controls, recommendations, and/or options for automatic training of models using parameters and hyper-parameters that are likely to result in the most efficient model generation.

The disclosed systems and methods address the technical problems of reducing computing resource consumption during the generation of machine-learning models and estimating data requirements for new models. Further, the disclosed systems and methods achieve improvements in computer functionality by avoiding expensive guess-and-check optimizations that result in over-tuned or under-tuned machine-learning models. Further, the disclosed methods and systems improve the resource allocation during parallelized processes for predictive model generation. In addition, the disclosed systems and methods may avoid poor performing systems caused by unexpected variance in the dataset, by comparing data profiles to identify comparable sample models that reduce the complexity of hyper-parameter tuning processes. These features result in systems and methods that improve the efficiency of the computerized systems for generating the machine-learning algorithms.

Reference will now be made in detail to the disclosed embodiments, examples of which are illustrated in the accompanying drawings.

FIG. 1 is a block diagram of an exemplary system 100, consistent with disclosed embodiments. System 100 may be used identify or estimate data requirements to train machine-learning predictive models with the goal of reducing computational expenses. System 100 may include an optimization system 105 which may include a data profiler 110, a model generator 120, and an hyper-parameter optimizer 130. System 100 may additionally include online resources 140, client devices 150, computing clusters 160, and databases 180. In some embodiments, as shown in FIG. 1, components of system 100 may be connected to a network 170. However, in other embodiments components of system 100 may be connected directly with each other, without network 170.

Online resources 140 may include one or more servers or storage services provided by an entity such as a provider of website hosting, networking, cloud, or backup services. In some embodiments, online resources 140 may be associated with hosting services or servers that store web pages with user credit histories or records of transactions. In other embodiments, online resources 140 may be associated with a cloud computing service such as Amazon Web Services™. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as completion messages and notifications.

Client devices 150 may include one or more computing devices configured to perform one or more operations consistent with disclosed embodiments. For example, client devices 150 may include a desktop computer, a laptop, a server, a mobile device (e.g., tablet, smart phone, etc.), a gaming device, a wearable computing device, or other type of computing device. Client devices 150 may include one or more processors configured to execute software instructions stored in memory, such as memory included in client devices 150, to perform operations to implement the functions described below. Client devices 150 may include software that when executed by a processor performs internet-related communication (e.g., TCP/IP) and content display processes. For instance, client devices 150 may execute browser software that generates and displays interfaces including content on a display device included in, or connected to, client devices 150. Client devices 150 may execute applications that allows client devices 150 to communicate with components over network 170, and generate and display content in interfaces via display devices included in client devices 150. The display devices may be configured to display images or icons described in connection with FIG. 14. The disclosed embodiments are not limited to any particular configuration of client devices 150. For instance, a client device 150 may be a mobile device that stores and executes mobile applications to perform operations that provide functions offered by optimization system 105 and/or online resources 140. In certain embodiments, client devices 150 may be configured to execute software instructions relating to location services, such as GPS locations. For example, client devices 150 may be configured to determine a geographic location and provide location data and time stamp data corresponding to the location data.

Computing clusters 160 may include a plurality of computing devices in communication. For example, in some embodiments, computing clusters 160 may be a group of processors in communication through fast local area networks. In other embodiments computing clusters 160 may be an array of graphical processing units configured to work in parallel as a GPU cluster. In such embodiments, computing clusters 160 may include heterogeneous or homogeneous hardware. In some embodiments, computing clusters 160 may include a GPU driver for the each type of GPU present in each cluster node, a Clustering API (such as the Message Passing Interface, MPI), and VirtualCL (VCL) cluster platform such as a wrapper for OpenCL™ that allows most unmodified applications to transparently utilize multiple OpenCL devices in a cluster. In yet other embodiments, computing clusters 160 may operate with distcc (a program to distribute builds of C, C++, Objective C or Objective C++ code across several machines on a network to speed up building), and MPICH (a standard for message-passing for distributed-memory applications used in parallel computing), Linux Virtual Server™, Linux-HA™, or other director-based clusters that allow incoming requests for services to be distributed across multiple cluster nodes.

Databases 180 may include one or more computing devices configured with appropriate software to perform operations consistent with providing optimization system 105, model generator 120, and hyper-parameter optimizer 130 with data for generation of sample models to estimate data requirements and correlate datasets with data profiles. Databases 180 may include, for example, Oracle™ databases, Sybase™ databases, or other relational databases or non-relational databases, such as Hadoop™ sequence files, HBase™, or Cassandra™. Databases 180 may include computing components (e.g., database management system, database server, etc.) configured to receive and process requests for data stored in memory devices of the database(s) and to provide data from the database(s).

While databases 180 are shown separately, in some embodiments databases 180 may be included in or otherwise related to one or more of optimization system 105, data profiler 110, model generator 120, hyper-parameter optimizer 130, and online resources 140.

Databases 180 may be configured to collect and/or maintain the data associated with sample datasets used to generate the sample models and provide it to the optimization system 105, model generator 120, hyper-parameter optimizer 130, and client devices 150. Databases 180 may collect the data from a variety of sources, including, for instance, online resources 140. Databases 180 are further described below in connection with FIG. 5.

Data profiler 110 may include one or more computing systems configured to perform operations consistent with extracting features from a dataset and/or comparing data profiles to assess similarity between datasets. In some embodiments, data profiler 110 may receive requests to profile a dataset directly from client devices 150. Alternatively, data profiler 110 may receive the request from other components of system 100. For example, client devices 150 may send requests to online resources 140, which then sends requests to optimization system 105. The request may include a dataset previously locally stored in client devices 150 or a location for file transfer.

In some embodiments, as a response to data profiling requests from databases 180 or client devices 150, optimization system 105 may initiate or request a data profiling and/or classification process using data profiler 110. The processes may include high-dimensional clustering methods, such as clustering by pattern similarity. Additionally, or alternatively, the processes by data profiler 110 may include statistical analyses between datasets to determine the closeness between objects and the similarity of the patterns exhibited by objects within the dataset, as further described in connection with FIG. 10.

In some embodiments, the request for profiling a dataset may attach the dataset to be analyzed. For example the requests from client devices 150 may include a ZIP folder storing user data. This user data may later be used to evaluate a minimum number of samples required to generate a machine-learning algorithm using the user data. Alternatively, the requests to data profiler 110 may include pointers or addresses in databases 180 for retrieving information. For example, sample data stored in databases 180 may be retrieved during the categorization of sample data for generating the sample models as further described in connection with FIG. 7. In other embodiments, data profiler 110 may handle profiling requests in conjunction with model generator 120. For example, model generator 120 may be used to generate a model that determines bucket or category sizes and models that categorize features based on generated models.

Data profiler 110 may correlate datasets and generate a similarity score that may be later used to facilitate the identification of minimum data requirements. Data profiler 110 may also generate an identification result based on the information received from the client device request and transmit the information to client devices 150 about the data profile of the user dataset. Data profiler 110 is further described below in connection with FIG. 2.

Model generator 120 may include one or more computing systems configured to generate predictive models. For example, model generator 120 may include computing systems to generate models that predict credit default of a user. Model generator 120 may receive or obtain information from databases 180, computing clusters 160, online resources 140, and data profiler 110. For example, model generator 120 may receive a plurality of transaction records from databases 180 and online resources 140. Model generator 120 may also receive other datasets, such as credit default records or credit history from databases 180.

Model generator 120 may generate models selected from multiple types of models. The models may include convolutional neural networks (CNN), recurrent neural networks (RNN), multilayer perceptrons (MLP), Random Forest (RP), and/or linear regressions. For example, identification models may be neural networks that determine attributes in a dataset based on extracted parameters. However, models may also include regression models that estimate the relationships between input and output variables. The generated models may additionally sort elements of a dataset using one or more classifiers to determine the probability of a specific outcome. Further, model generator 120 may train parametric, non-parametric, and/or semi-parametric models. In system 100, model generator 120 may generate both sample models, used for the determination of minimum data requirements, and user models, trained with the user data.

In some embodiments, sample models may include neural network models that represent an input layer and an output layer connected via nodes with different activation functions as in a convolutional neural network. "Layers" in the neural network may transform an input variable into an output variable (e.g., holding the class scores) through a differentiable function. The neural network may include multiple distinct types of layers. For example, the sample model may include a convolution layer, a pooling layer, a ReLU Layer, a number filter layer, a filter shape layer, and/or a loss layer. Further, the convolution neural network may comprise a plurality of nodes. Each node may be associated with an activation function and each node maybe connected with other nodes via synapsis that are associated with a weight. The sample neural networks may model input/output relationships of variables and parameters by generating a number of interconnected nodes which contain an activation function. The activation function of a node may define a resulting output of that node given an argument or a set of arguments. The neural networks may generate patterns to the network via an 'input layer', which communicates to one or more "hidden layers" where the system determines regressions via weighted connections. Sample models, however, may also include Random Forests, composed of a combination of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Sample models may additionally or alternatively include classification and regression trees, or other types of predictive models. Model generator 120 may submit sample models to estimate minimum data requirements. Model generator 120 is further described below in connection with FIG. 3.

Hyper-parameter optimizer 130 may include one or more computing systems that performs iterations in models to tune hyper-parameters. For example, hyper-parameter optimizer 130 may be implemented with a computer having a plurality of processing nodes that search optimized hyper-parameters and model parameter configurations for machine-learning models. In some embodiments, hyper-parameter optimizer 130 may be in communication with computer clusters 160 and generate parallel processing requests to adjust and search hyper-parameters to allow multiple hyper-parameter configurations to be evaluated concurrently. Alternatively or additionally, hyper-parameter optimizer 130 may have the ability to distribute the training process and include early stopping configurations based on default ranges, user overrides, and/or validation schemes. In some embodiments, hyper-parameter optimizer 130 may receive requests from model generator 120 and tune hyper-parameters of a model by applying one or more of Bayesian optimization, gradient-based optimization, or random search optimization.

FIG. 1 shows data profiler 110, model generator 120, and hyper-parameter optimizer 130 as different components. However, data profiler 110, model generator 120, and hyper-parameter optimizer 130 may be implemented in the same computing system. For example, all elements in optimization system 105 may be embodied in a single server.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
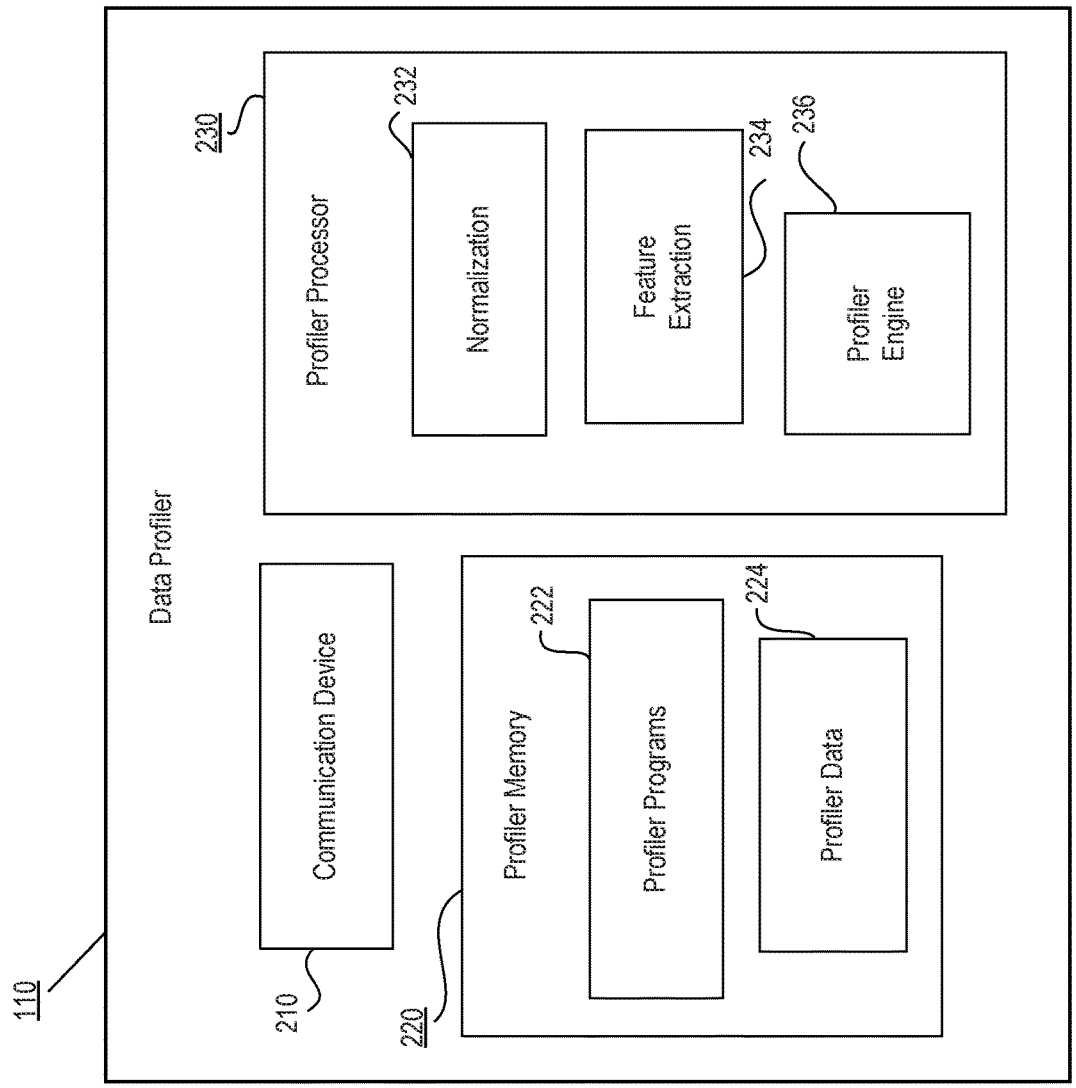
FIG. 2 is a block diagram of an exemplary data profiler, consistent with disclosed embodiments.

FIG. 2 shows a block diagram of an exemplary data profiler 110, consistent with disclosed embodiments. Data profiler 110 may include a communication device 210, a profiler memory 220, and one or more profiler processors 230. Profiler memory 220 may include profiler programs 222 and profiler data 224. Profiler processor 230 may include a data normalization module 232, a dataset feature extraction module 234, and a profiler engine 236.

In some embodiments, data profiler 110 may take the form of a server, a general purpose computer, a mainframe computer, or any combination of these components. In other embodiments, data profiler 110 may be a virtual machine. Other implementations consistent with disclosed embodiments are possible as well.

Communication device 210 may be configured to communicate with one or more databases, such as databases 180 described above, either directly or via network 170. In particular, communication device 210 may be configured to receive datasets from databases 180 to identify data attributes and assess similarity between datasets. In addition, communication device 210 may be configured to communicate with other components as well, including, for example, model generator 120 and hyper-parameter optimizer 130. For example, model generator 120 may transmit a plurality of datasets to data profiler 110 during the classification of sample models.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Profiler memory 220 may include one or more storage devices configured to store instructions used by profiler processor 230 to perform functions related to disclosed embodiments. For example, profiler memory 220 may store software instructions, such as profiler programs 222, that may perform operations when executed by profiler processor 230. The disclosed embodiments are not limited to separate programs or computers configured to perform dedicated tasks. For example, profiler memory 220 may include a single profiler program 222 that performs the functions of data profiler 110, or profiler program 222 may comprise multiple programs. Profiler memory 220 may also store profiler data 224 that is used by profiler program 222.

In certain embodiments, profiler memory 220 may store sets of instructions for carrying out processes to determine a data profile of a dataset, categorize datasets based on their profiles, and/or determine the similarity between datasets, further described below in connection with FIG. 10. In certain embodiments, profiler memory 220 may store sets of instructions for clustering datasets and assessing whether similar machine-learning predictive models can be generated based on the data profiles. Other instructions are possible as well. In general, instructions may be executed by profiler processor 230 to perform processes consistent with disclosed embodiments.

In some embodiments, profiler processor 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, profiler processor 230 may be a plurality of devices coupled and configured to perform functions consistent with the disclosure. For example, profiler processor 230 may include a plurality of co-processors, each configured to run specific data profiler 110 operations such as floating point arithmetic, graphics, signal processing, string processing, cryptography or I/O interfacing.

In some embodiments, profiler processor 230 may execute software to perform functions associated with each component of profiler processor 230. In other embodiments, each component of profiler processor 230 may be an independent device. In such embodiments, each component may be a hardware device configured to specifically process data or perform operations associated with categorizing datasets, comparing datasets, and/or extracting features from a large datasets. For example, data normalization module 232 may be a field-programmable gate array (FPGA), data feature extraction module 234 may be a graphics processing unit (GPU), and profiler engine 236 may be a central processing unit (CPU). Other hardware combinations are also possible. In yet other embodiments, combinations of hardware and software may be used to implement profiler processor 230.

Data normalization module 232 may normalize datasets so they can be profiled, clustered, compared, and/or classified. For example, communication device 210 may receive a dataset from client devices 150 to be profiled and compared with sample datasets stored in databases 180. The received dataset may be in a format that cannot be processed by data profiler 110 because it is in an incompatible format or may have parameters that cannot be processed. For example, the received dataset may be received in a specific format such as Hierarchical Data Format (HDF) or in a vector image format such as Computer Graphic Metafile (CGM). Then, data normalization module 232 may convert the received dataset to a standard format such as comma-separated values (CSV), Excel (XLSX), or plain text. The datasets may also be converted to JavaScript Object Notation (JSON), Extensible Markup Language, Hyper Text Markup Language, Portable Document Format. Further, datasets may be initially presented as images or audio files. In such embodiments images, MP3, or MP4 formats may be converted to other data basic file formats.

For example, the format of the datasets may be normalized using instructions such as:

```
from xml import CSV
CSV = csv.parse('input.xml')
col1 = csv.getroot( )
for att in col1:
    first = att.find('attval').text
    for subatt in att.find('children'):
        second = subatt.find('attval').text
        print('{ },{ }'.format(first, second))
```

Alternatively, or additionally, the received dataset may have a dimensionality that is incompatible with programs of data profiler 110. For example, the dataset may include a very large number of dimensions, which may be incompatible with models of data profiler 110. Then, data normalization module 232 may convert the received dataset to a different dimensionality dataset. For example, data normalization module 232 may determine that the dataset provided by a user includes too many features, or too many redundant or correlated features. In such embodiments, data normalization module 232 may normalize the dataset by applying dimensionality reduction techniques such as Missing Value Ratio, Low Variance Filter, High Correlation Filter, Independent Component Analysis, and/or Stochastic Neighbor Embedding. In some embodiments, the normalization may be guided by a model data. For example, a model dataset stored in profiler data 224 may be used to guide the transformations of the received dataset.

In some embodiments, profiler processor 230 may implement data normalization module 232 by executing instructions to create an application in which datasets are received and transformed. In other embodiments, however, data normalization module 232 may be a separate hardware device or group of devices configured to carry out operations. For example, to improve performance and speed of the dataset profiling and transformations, data normalization module 232 may be an SRAM-based FPGA that functions as data normalization module 232. Further, data normalization module 232 may have an architecture designed for implementation of specific algorithms. In such embodiments, data normalization module 232 may include a Simple Risc Computer (SRC) architecture or other reconfigurable computing system.

Data feature extraction module 234 may extract features from a received dataset or a normalized dataset to generate a data profile. In some embodiments, features may be extracted from a dataset by applying a pre-trained neural network. For example, in some embodiments pre-trained networks such as Inception-v3 or AlexNet may be used to automatically extract features from a target dataset and generate a corresponding data profile. In such embodiments, data feature extraction module 234 may import layers of a pre-trained neural network, determine features described in a target layer of the pre-trained network, and initialize a multiclass fitting model using the features in the target layer and datasets received for extraction.

In other embodiments other deep learning models such as Fast R-CNN can be used for automatic feature extraction. In yet other embodiments processes such as histogram of oriented gradients (HOG), speeded-up robust features (SURF), local binary patterns (LBP), or Haar wavelets may also be used to extract features from a received dataset. In some embodiments, data feature extraction module 234 may partition each dataset in a plurality of channels and a plurality of portions, such that the channels determine a histograms for different dimensions, determine feature vectors from intensity levels, and identify objects in a region of interest. Data feature extraction module 234 may perform other techniques to extract features and generate data profiles from received datasets further described below in connection with FIGS. 9-10 and 13.

Profiler processor 230 may implement data feature extraction module 234 by executing software to create an environment for extracting data features. However, in other embodiments data feature extraction module 234 may include independent hardware devices with specific architectures designed to improve the efficiency of aggregation or sorting processes. For example, data feature extraction module 234 may be a GPU array configured to partition and analyze layers in parallel. Further, data feature extraction module 234 may be configured to implement a programming interface, such as Apache Spark™, and execute data structures, cluster managers, and/or distributed storage systems. For example, data feature extraction module 234 may include a resilient distributed dataset that is manipulated with a standalone software framework and/or a distributed file system.

Profiler engine 236 may cluster data profiles and/or calculate similarity scores between a received dataset and sample datasets that may be used for estimating minimum data requirements. For example, profiler engine 236 may perform density and grid based clustering methods, such as CLIQUE, for determining the similarity between datasets. In such embodiments, profiler engine 236 may discretize the data space into non-overlapping cells by partitioning each dimension to a number of buckets or categories. Each bucket is dense if the fraction of total data points contained in the bin is greater than a threshold. The algorithm finds dense cells in lower dimensional spaces and merge them to form clusters in higher dimensional spaces. Alternatively, or additionally, profiler engine 236 may apply representative cluster center algorithms, such as ORCLUS, to find projected clusters based on representative cluster centers in a set of cluster dimensions. Further, in other embodiments, profiler engine 236 may find subsets of data that share similar values in a subset of dimensions using fascicle methods. These clustering techniques may be applied to raw datasets (e.g., datasets received directly from client devices 150) or to data profiles, after they are processed by data feature extraction module 234.

In some embodiments, profiler engine 236 may perform a density-based spatial clustering of applications with noise (DBSCAN). In such embodiments, profiler engine 236 may find a distance between coordinates associated with the datasets, establish core points, find the connected components of core points on a neighbor graph, and assign each non-core point to a nearby cluster. In some embodiments, profiler engine 236 may be configured to only create two clusters for each pair of datasets in a binary generation process. Alternatively, or additionally, profiler engine 236 may implement non-linear clustering algorithms such as MST-based clustering.

Profiler engine 236 may be implemented by profiler processor 230. For example, profiler processor 230 may execute software to create an environment to execute the clustering and classification methods. However, in other embodiments profiler engine 236 may include hardware devices configured to carry out parallel operations. Some hardware configurations may improve the efficiency of calculations, particularly when multiple calculations are being processed in parallel. For example, profiler engine 236 may include multicore processors or computer clusters to divide tasks and quickly perform calculations. In some embodiments, profiler engine 236 may receive a plurality of models from model generator 120. In such embodiments, profiler engine 236 may include a scheduling module. The scheduling module may receive models and assign each model to independent processors or cores. In other embodiments, profiler engine 236 may be FPGA arrays to provide greater performance and determinism.

The components of data profiler 110 may be implemented in hardware, software, or a combination of both. For example, although one or more components of data profiler 110 may be implemented as computer processing instructions embodied in computer software, all or a portion of the functionality of data profiler 110 may be implemented in dedicated hardware. For instance, groups of GPUs and/or FPGAs maybe used to quickly analyze data in profiler processor 230.

Figure 3:
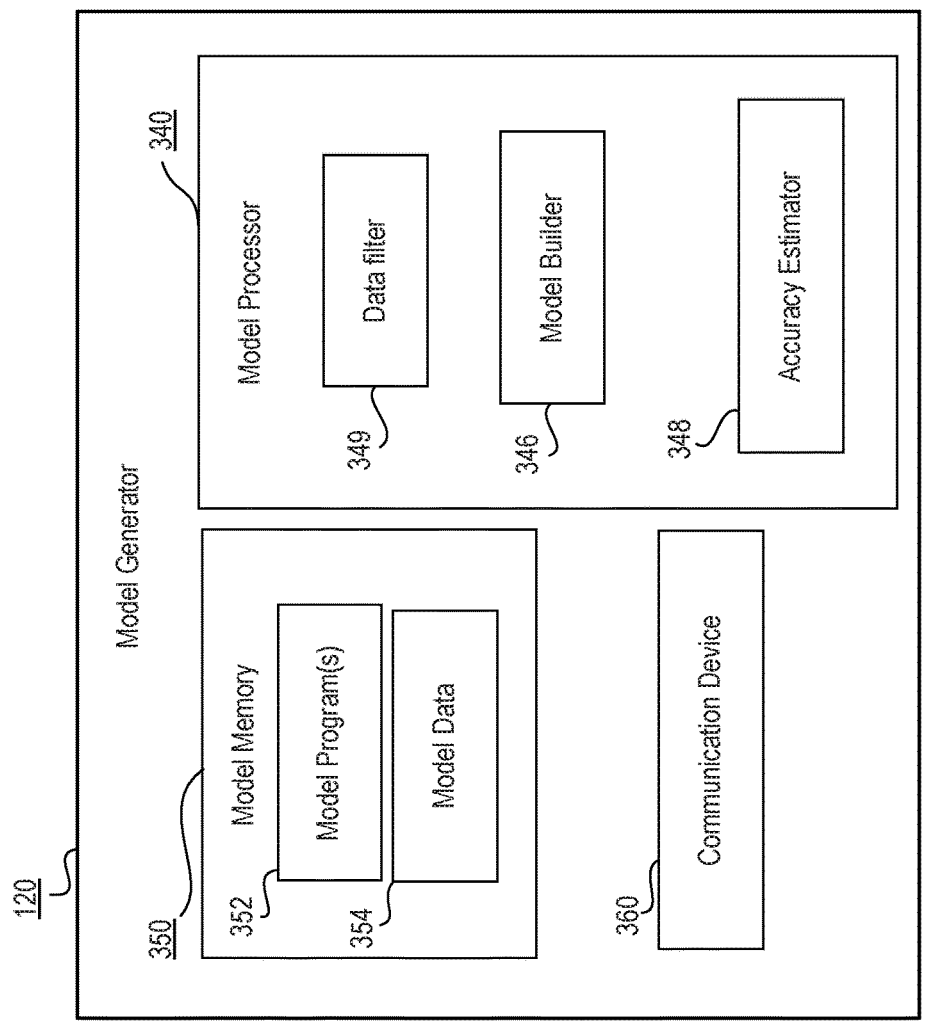
FIG. 3 is a block diagram of an exemplary model generator, consistent with disclosed embodiments.

Referring now to FIG. 3, there is shown a block diagram of an exemplary model generator 120, consistent with disclosed embodiments. Model generator 120 may include a model processor 340, a model memory 350, and a communication device 360.

Model processor 340 may be embodied as a processor similar to profiler processor 230. Model processor may include a model builder 346, an accuracy estimator 348, and an data filter 349.

Model builder 346 may be implemented in software or hardware configured to create identification models based on training data. In some embodiments, model builder 346 may generate neural networks. For example, model builder 346 may take a sample dataset from database 180 to train a neural network that may be later used for estimating data requirements. In such embodiments, model builder 346 may calculate with nodes, synapsis between nodes, pooling layers, and activation functions, to create a predictive model. Model builder 346 may determine coefficients and parameters of the neural networks based on the training dataset. In such embodiments, model builder 346 may select and/or develop neural networks in a backpropagation with gradient descent. However, in other embodiments, model builder 346 may use Bayesian algorithms or clustering algorithms to generate predictive models. In yet other embodiments, model builder 346 may use association rule mining, including linear regressions, random forest analysis, and/or deep learning algorithms to develop models. In some embodiments, to improve the efficiency of the model generation, model builder 346 may be implemented in one or more hardware devices, such as FPGAs, configured to generate machine-learning models.

Accuracy estimator 348 may be implemented in software or hardware configured to evaluate the accuracy of a model. For example, accuracy estimator 348 may estimate the accuracy of a model, generated by model builder 346, by using a validation dataset. In some embodiments, the validation dataset may be a portion of a training dataset, that was not used to generate the identification model. Accuracy estimator 348 may generate error rates for the identification models, and may additionally assign weight coefficients to models based on the estimated accuracy.

Data filter 349 may be embodied by software or hardware that may filter datasets using during model generation. For example, data filter 349 may identify repeated records in a datasets and eliminate one of the repeated records to prevent data over processing. Alternatively, or additionally, data filter 349 may consist of a microprocessor and some peripheral components such as memory to store data and filter coefficients for the data sets. In some embodiments, data filter 349 may include FPGA, ASIC, or a specialized digital signal processor (DSP) with specific paralleled architecture for expediting filtering operations.

Model memory 350 may include one or more storage devices configured to store instructions used by model processor 340 to perform operations related to disclosed embodiments. For example, model memory 350 may store software instructions, such as model program 352, that may perform operations when executed by model processor 340. In addition model memory 350 may include model data 354, which may include sample datasets to train sample models such as sample convolutional neural network, recurrent neural networks, multilayer perceptrons, and/or linear regressions.

In certain embodiments, model memory 350 may store sets of instructions for carrying out processes to generate a model that predicts credit defaults based on a record of credit transactions. For example, optimization system 105 may execute processes stored in model memory 350 using information from databases 180 and/or data from data profiler 110. Exemplary processes to generate a model are described below in connection with FIG. 11.

Figure 4:
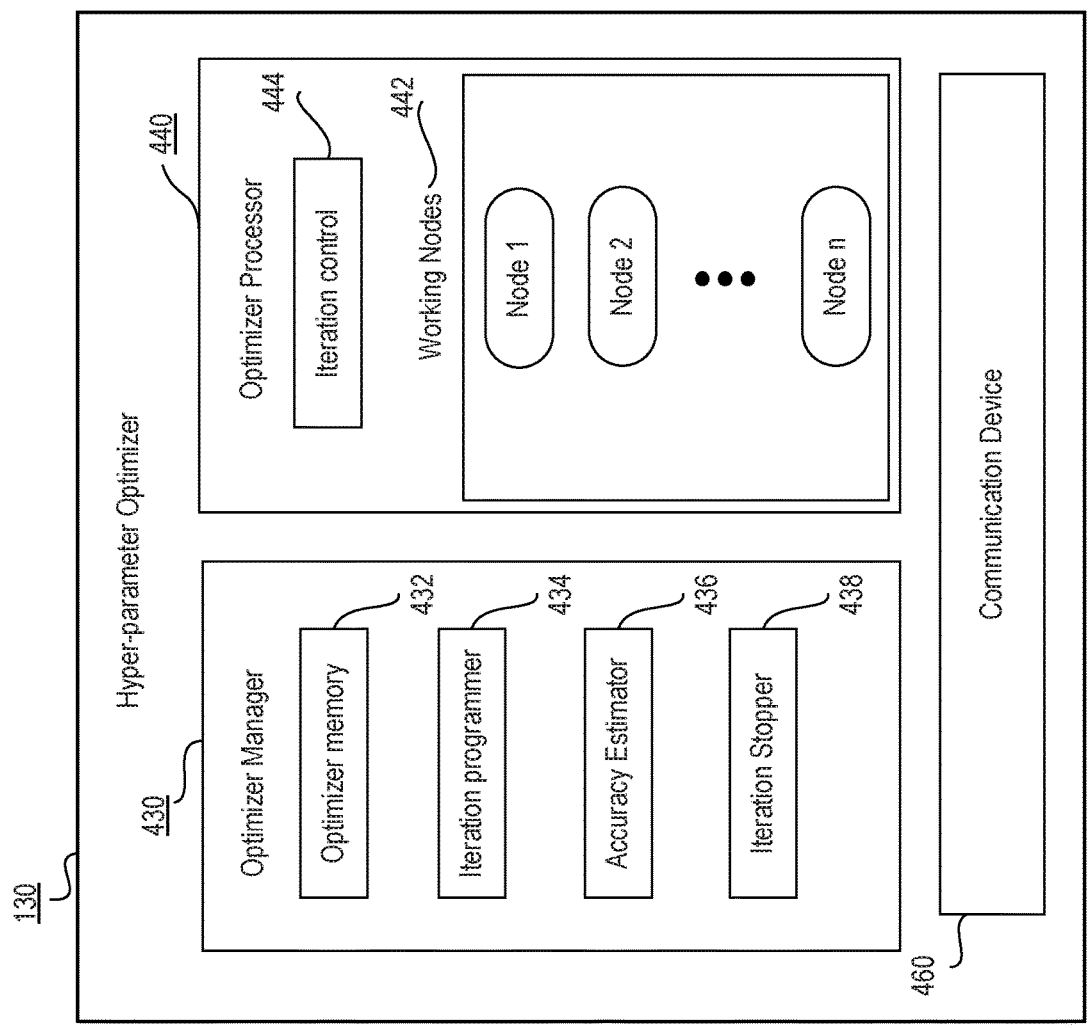
FIG. 4 is a block diagram of an exemplary hyper-parameter optimizer, consistent with disclosed embodiments.

Referring now to FIG. 4, there is shown a block diagram of an exemplary hyper-parameter optimizer 130, consistent with disclosed embodiments. Hyper-parameter optimizer 130 may include an optimizer manager 430, an optimizer processor 440, and a communication device 460. In some embodiments, hyper-parameter optimizer 130 may be configured to communicate with model generate 120 to identify or tune hyper-parameters for predictive models that result in higher accuracy.

Generating robust machine-learning models can be computationally expensive because determining hyperparameters is frequently difficult and may demand significant resources. Particularly for large training datasets, performing all the potential iterations is cumbersome. Although using a parallel local search optimization framework may ease the challenges and expense of hyperparameter optimization, these processes have their own challenges of efficient allocation of computer resources and the determination of the ideal division of tasks to reduce the expense of communication between nodes. Hyper-parameter optimizer 130 may be configured to address these issues in optimizer system 105 by enabling concurrent evaluation of multiple hyper-parameter configurations, even when data and model training must be distributed across computing resources to minimize the impact of large datasets. Hyper-parameter optimizer 130 may distribute the training process and parallelize the tuning process, and by determining early stopping of long-running hyper-parameter configurations that have stagnated can free up resources for additional configurations. Further, hyper-parameter optimizer 130 may subsample the data for training and validation given for the model, based on estimations of minimum data requirements.

Optimizer manager 430 may be implemented in software or hardware configured to prepare tasks and control the optimization process. Optimizer manager 430 may communicate with model generator 120 to prepare iterations for optimization tasks and control the workflow of the optimization strategy. For example, optimizer manager 430 may control the execution of hyper-parameter search methods by determining target accuracies, setting default ranges, determining overrides, and implementing validation schemes. Further, optimizer manager 430 may setup communication buses with model generator 120, to supply data from the tuning tasks.

Optimizer manager 430 may include an iteration programmer 434 that may determine workload status of optimizer processor 440 and generate a work allocation plan by distributing tasks across multiple worker nodes in optimizer processor 440. Further, optimizer manager 430 may include a local accuracy estimator 436 which, similar to accuracy estimator 348, may confirm the accuracy of models. In addition, optimizer manger 430 may include an iteration stopper 438, which may be configured to stop tasks in optimizer processor 440 when a time is exceeded, to prevent stagnation during hyper-parameter tuning.

Optimizer memory 432 may include one or more storage devices configured to store instructions used by optimizer processor 440 to perform functions related to disclosed embodiments. For example, optimizer memory 432 may store software instructions that may perform one or more operations when executed by optimizer processor 440. In addition, optimizer memory 432 may include sample datasets, which may correlate hyper-parameters with a plurality of data profiles for the determination of similarity between datasets. Datasets with similar profiles may be optimized using similar hyper-parameters facilitating the hyper-parameter search.

In some embodiments, optimizer manager 430 may setup the hyper-parameter tuning by generating a hyper-parameter space prior performing modeling iterations. For example, optimizer manager 430 may retrieve from optimizer memory 432 instructions for a default hyper-parameter search strategy. These instructions may include machine instructions for a Latin hypercube sample (LHS), which provides a uniform sample of the hyperparameter space. Alternatively, optimizer manager 430 may create a hyperparameter grid or a random hyper-parameter space to setup the iterations. Moreover, optimizer manager 430 may determine the number of working nodes for each model. Depending on the size of the dataset used for model training, the selected search method and its configuration, and the number of working nodes available, optimizer manager 430 may determine a number of workers for each model training. Then, optimizer manager 430 may determine the number of models that can be trained in parallel, the different strategies that will be used for evaluation, and the server optimizer processor 440 limitations. This process result in an optimization allocation and the hyper-parameter space of allocation. Once optimizer manager 430 identifies a hyper-parameter space from the LHS, or other sampling technique, and determines the worker allocation, optimizer manager 430 may communicate with optimizer processor 440 to execute the optimization tasks.

Optimizer processor 440 may include an iteration control 444 and a plurality of working nodes 442. Optimizer processor 440 may be embodied as a processor similar to profiler processor 230 and have working nodes 442 as virtual processing portions with different assigned tasks. In other embodiments, however, optimizer processor 440 may be embodied by multiple hardware components. For example, iteration control 444 may include a CPU connected in parallel a plurality of working nodes 442 implemented as GPUs. Optimizer processor 440 may receive the hyper-parameter space and the work allocation determined by optimizer manager 430. Iteration control 444 then distributes tasks to the working nodes 442 to determine the model efficiency with the different hyper-parameters. Iteration control 444 may then select the best samples in an iterative process to generate a new population of model configurations for each iteration. The strengths of this approach include handling continuous, integer, and categorical variables.

Figure 5:
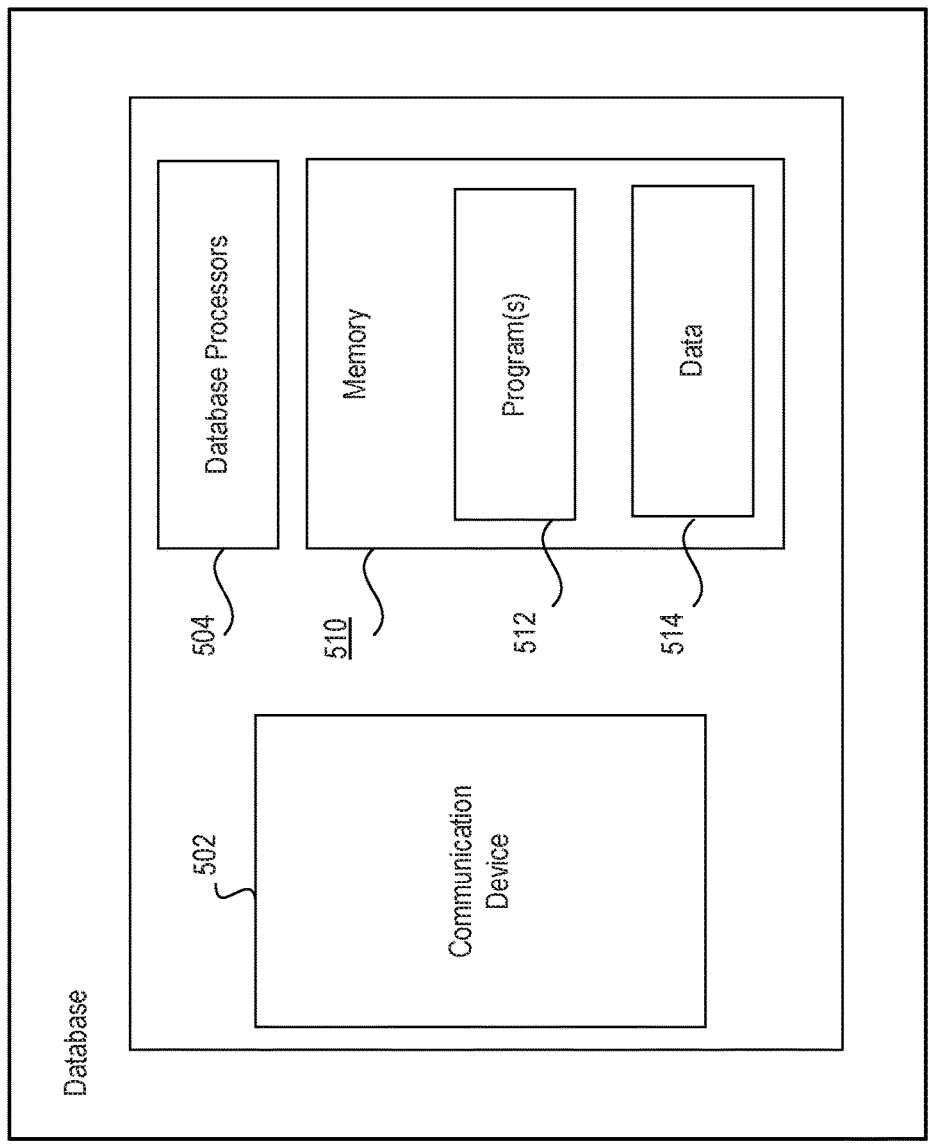
FIG. 5 is a block diagram of an exemplary database, consistent with disclosed embodiments.

Referring now to FIG. 5, there is shown a block diagram of an exemplary database 180 (FIG. 1), consistent with disclosed embodiments. Database 180 may include a communication device 502, one or more database processors 504, and database memory 510 including one or more database programs 512 and data 514.

In some embodiments, databases 180 may take the form of servers, general purpose computers, mainframe computers, or any combination of these components. Other implementations consistent with disclosed embodiments are possible as well.

Communication device 502 may be configured to communicate with one or more components of system 100, such as online resources 140, optimization system 105, model generator 120, hyper-parameter optimizer 130, and/or client devices 150. In particular, communication device 502 may be configured to provide to model generator 120 and hyper-parameter optimizer 130 datasets, such as records of credit card transactions, that may be used to generate a neural network, an identification model, or a predictive model.

Communication device 502 may be configured to communicate with other components as well, including, for example, model memory 350 (FIG. 3). Communication device 502 may take any of the forms described above for communication device 210 (FIG. 2).

Database processors 504, database memory 510, database programs 512, and data 514 may take any of the forms described above for profiler processors 230, memory 220, profiler programs 222, and profiler data 224, respectively, in connection with FIG. 2. The components of databases 180 may be implemented in hardware, software, or a combination of both hardware and software, as will be apparent to those skilled in the art. For example, although one or more components of databases 180 may be implemented as computer processing instruction modules, all or a portion of the functionality of databases 180 may be implemented instead in dedicated electronics hardware.

Data 514 may be data associated with websites, such as online resources 140. Data 514 may include, for example, information relating to websites of credit card issuers or merchants that receive credit cards. Data 514 may include datasets for machine-learning predictive models such as records of user transactions or histories of potential costumers credit scores.

In some embodiments, databases 180 may store a plurality of datasets and their associated dataset profile, which may be determined by, for example, data profiler 110. In addition, databases 180 may store entries associating model types, data categories or data profiles for the training data used for the models, and the minimum number of samples in the training data used for the models.

Data profiles in databases 180 may be populated by database processors 504 to generate a plurality of sample datasets in database data 514. For example, database processor 504 may receive a dataset from a user and communicate with data profiler 110 to identify a data schema of the dataset. For this identification database processor may generate a sample vector that represents statistical metrics of the dataset. Database processor 504 may also generate a data index including a plurality of stored vectors corresponding to multiple reference datasets, the stored vectors including statistical metrics of the reference datasets and information based on corresponding data schema of the reference datasets. With this information, database processor 504 may generate similarity metrics of the sample dataset to references in the user datasets. These similarity metrics may later be used by optimization system 105 to determine minimum data requirements to achieve a threshold accuracy.

In some embodiments, databases 180 may classify new datasets based on a sample dataset to find related and/or source datasets. For example, when a new dataset is stored in databases 180, database processor 540 may identify a data schema of the new reference dataset. Then, database processor 540 may generate a new reference vector representing statistical measures of the reference dataset, and update the data index based on the new reference vector. Further, database processor 540 may perform the correlations between already stored and new data based on aggregation modules. The aggregation modules may identify a data schema of the reference datasets; generate vectors and a data index, store the data index in database memory 510 and associating the data index with a sample vector.

Moreover, databases 180 may also be configured to generate secondary sample vector and similarity metrics based on aggregated secondary vectors. For example, databases 180 may communicate with data profiler 110 to store statistics in a database entry. Statistics may include columns, standard deviation, frequency analysis, fuzzy overlap for entries, exact overlap for entries. Database processor 540 may develop profiles with multiple dimension. For example, the profiles may include dimensions for SSN, Address, Phone number, credit card number, and number of transactions. For classification, database processor 540 may also generate secondary columns to vectorize the data and indexes over the vectorized index.

Figure 6:
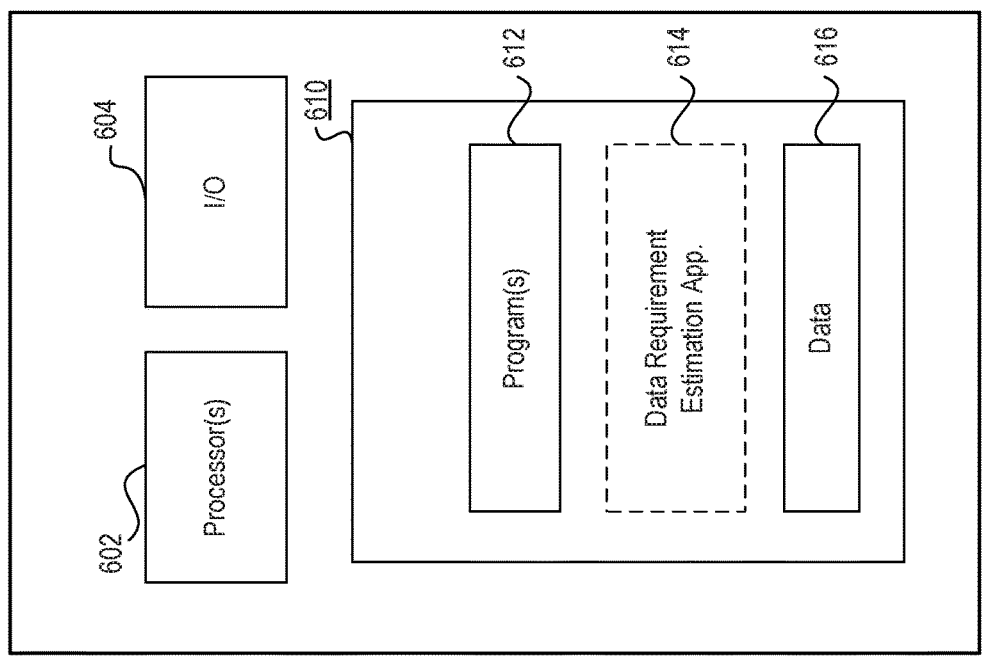
FIG. 6 is a block diagram of an exemplary client device, consistent with disclosed embodiments.

Referring now to FIG. 6, there is shown a block diagram of an exemplary client device 150 (FIG. 1), consistent with disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may comprise web browsers or similar computing devices that access web site consistent with disclosed embodiments.

Processor 602 may include one or more known processing devices, such as mobile device microprocessors manufactured by Intel™, NVIDIA™, or various processors from other manufacturers. The disclosed embodiments are not limited to any specific type of processor configured in client devices 150.

Memory 610 may include one or more storage devices configured to store instructions used by processor 602 to perform functions related to disclosed embodiments. For example, memory 610 may be configured with one or more software instructions, such as programs 612 that may perform operations when executed by processor 602. The disclosed embodiments are not limited to separate programs or computers configured to perform dedicated tasks. For example, memory 610 may include a single program 612 that performs the functions of the client devices 150, or program 612 may comprise multiple programs. Memory 610 may also store data 616 that is used for the generation of a predictive model. That is, memory 610 may store user data for training and validation of a new target predictive model.

In certain embodiments, memory 610 may store a data requirement estimation application 614 that may be executed by processor(s) 602 to perform one or more minimum data requirements estimation consistent with disclosed embodiments. The estimation application 614 may include instructions to display graphical user interfaces in client devices 150 that interface with optimizer system 105, like the graphical user interface described in connection with FIG. 14. In certain aspects, data requirement estimation application 614, or another software component, may be configured to request identification from optimization system 105 or determine the location of client devices 150. For instance, these software instructions, when executed by processor(s) 602 may process information to generate a minimum data requirement estimate.

I/O devices 604 may include one or more devices configured to allow data to be received and/or transmitted by client devices 150 and to allow client devices 150 to communicate with other machines and devices, such as other components of system 100. For example, I/O devices 604 may include a screen for displaying optical payment methods such as Quick Response Codes (QR), or providing information to the user. I/O devices 604 may also include components for NFC communication. I/O devices 604 may also include one or more digital and/or analog devices that allow a user to interact with client devices 150 such as a touch-sensitive area, buttons, or microphones. I/O devices 604 may also include one or more accelerometers to detect the orientation and inertia of client devices 150. I/O devices 604 may also include other components known in the art for interacting with optimization system 105.

The components of client devices 150 may be implemented in hardware, software, or a combination of both hardware and software, as will be apparent to those skilled in the art.

Figure 7:
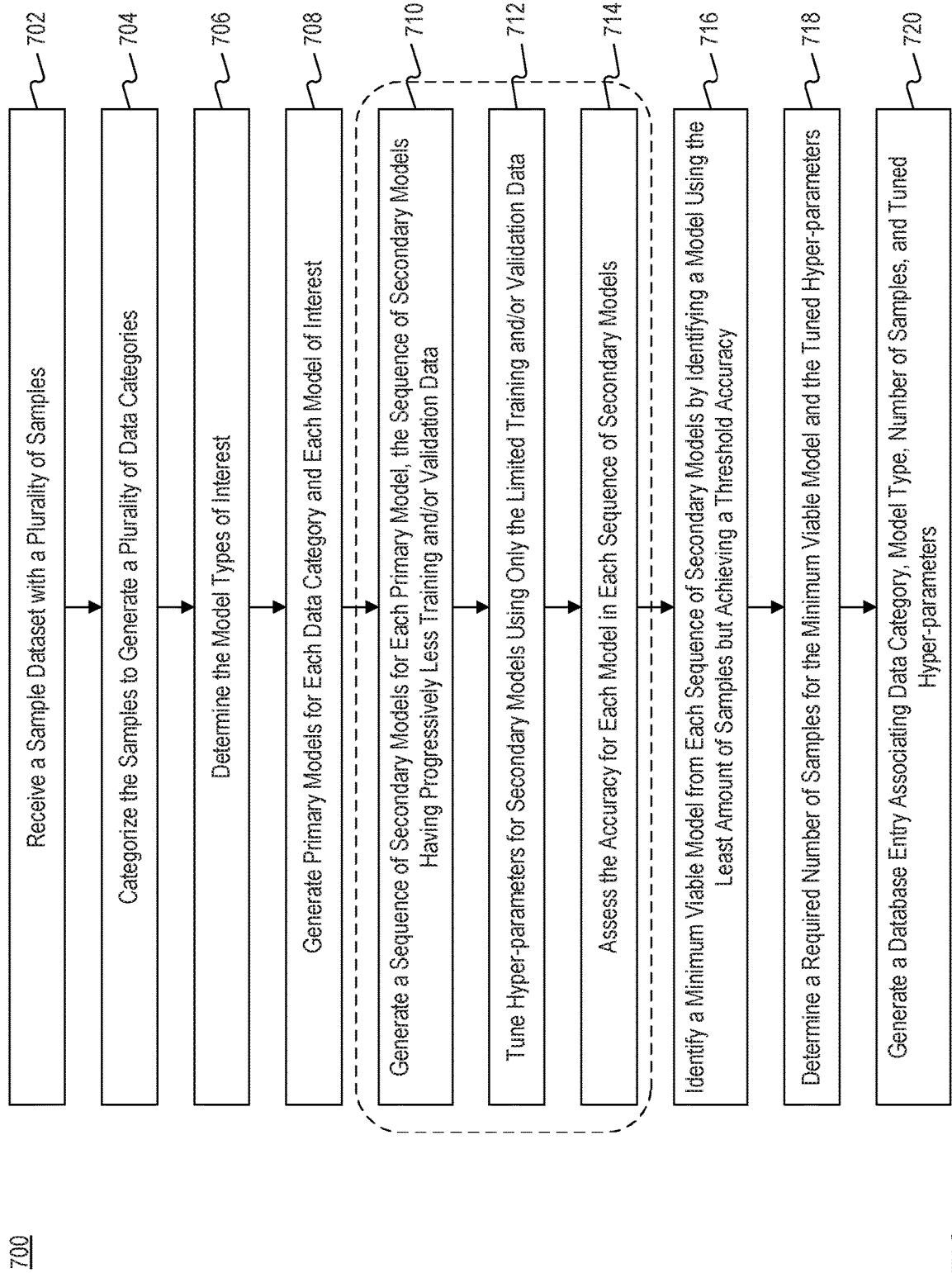
FIG. 7 is an exemplary flow chart illustrating a minimum viable model identification process, consistent with disclosed embodiments.

Referring now to FIG. 7, there is shown a flow chart of an exemplary minimum viable model identification process 700, consistent with disclosed embodiments. In some embodiments, identification process 700 may be executed by optimization system 105.

In step 702, optimization system 105 (FIG. 1) may receive sample datasets with a plurality of samples. For example, the datasets may include a plurality of credit or debit card transactions, payment histories associated with users, and credit default records of the users. The sample data may be retrieved from databases 180. Alternatively, or additionally, the sample data may be received from client devices 150, or it may be collected from online resource by being scraped from, for example, websites of merchants.

In step 704, optimization system 105 may categorize sample data to generate a plurality of data categories. For example, optimization system 105 may employ data profiler 110 to extract features from sample datasets and cluster them in groups. For example, profiler processor 230 may implement clustering techniques such as CLIQUE to classify datasets based on the data profile or use pre-trained neural networks to extract key features from sample datasets. Alternatively, or additionally, profiler processor may implement other unsupervised clustering techniques such as k-nearest neighbors (kNN), K-means, Fuzzy K-means, hierarchical clustering, and/or mixture of Gaussians. In some embodiments, the classification may cluster datasets based on their periodic profile. For example, when the sample data includes a plurality of credit card transactions, the datasets may be categorized in intervals of yearly transactions, monthly transactions, weekly transactions, and/or daily transactions. The sample data may be classified, or bucketed in each one of these buckets and categorized based on their category profile. In some embodiments, optimization system 105 may eliminate some of the records in the sample data in step 704. For example, optimization system 105 may delete repeated records in the sample data in step 704.

In step 706, optimization system 105 may select a group of machine-learning predictive model types to generate sample models. With the goal of providing estimates for future models, optimization system 105 may determine a group of selected model types for optimization. To reduce the amount of resources used, optimization system 105 may select to generate types of models that are commonly used. For example, if optimization system 105 is used for regression predictions, in step 706 optimization system 105 may determine that the model types of interest include random forest and linear regression. Alternatively, if optimization system 105 is used for classifications tasks, in step 706 optimization system 105 may determine that the model types of interest include convolutional neural network, time delay neural network, and Naive Bayes classifier. In other embodiments, however, optimization system 105 may determine that multiple model types are of interest and generate multiple machine-learning models based on available computing resources.

In step 708, optimization system 105 may generate primary models. Primary models may be trained with data from the data categories or buckets formed in step 704. Moreover, in step 708 at least one primary model maybe generated for each of the model types of interest. For example, if in step 704 optimization system 105 categorized data in three categories or buckets (e.g., a category for daily transactions, a category for monthly transactions, and a category for yearly transactions) and in step 706 optimization system determined four models of interest (e.g., a CNN, a RNN, a MLP, and a liner regression), in step 708 optimization system 105 may generate at least twelve primary machine-learning models, generating at least one model for each model type and each of the three data categories in step 706. That is, in step 708 optimization system 105 may generate at least four models for daily transactions, another four model types for monthly transactions, and another four models for yearly transactions. In this way, optimization system 105 would generate sample models for different category data profiles and also different model types, preparing to create correlations based on category data profiles and target model types that allows optimization system 105 to estimate minimum data requirements.

Steps 710-714 described tasks that optimization system 105 may perform to generate the sample models that will provide information about minimum data requirements. These steps may be performed concurrently in a loop and not necessarily in the sequence as displayed in FIG. 7.

In step 710, to search for minimum data requirements, optimization system 105 may generate a sequence of secondary models for each one of the primary models. The models in the sequence of secondary models may be trained with progressively reduced training datasets to figure out a minimum number of samples that is necessary to recreate (or approximate) the predictability and/or classification accuracy of the primary model. In some embodiments, primary models may be retrained using progressively less data but having the same hyper-parameters as the first user model. For example, continuing with the previous example with twelve primary models, in step 710 optimization system 105 may generate twelve sequences of secondary models. One of the sequences may generate models based on, for example, the primary CNN model for the daily transaction data category. If this CNN model was initially trained with fifty million records, the secondary models may reduce the number of records in the training data for every element of the sequence. The reduction in the sample size may be linear (i.e., reduce by one million samples for every iteration) and/or exponential (i.e., reduce by a factor of 2 in every iteration). Alternatively, the sequence may be generated using search algorithms such as a Fibonacci search, a jump search, an interpolation search, a recursive function, or a binary search to determine a testing sample size for training.

In step 712, hyper-parameters of the secondary models may be tuned. For example, each one of the models from the secondary sequences may be passed through a hyper-parameter tuning process. For example, optimization system 105 may perform a grid search by running each one of the secondary models for each setting of parameters. Alternatively, or additionally, optimization system 105 may perform a random search of hyper-parameters for each one of the secondary models and/or perform a Bayesian optimization or an evolutionary optimization. Step 712 may be performed concurrently with step 710. For example, as the sequence of progressively less data is being used, models may be run through the tuning operations.

In step 714 optimization system 105 may assess the accuracy of each one of the secondary models. In step 714, optimization system may use validation data to determine the accuracy of each secondary model. For example, once hyper-parameters have been tuned in step 714 for secondary models based on the CNN for the monthly transactions data category, optimization system 105 may determine the accuracy of the model by comparing inputs of validation data with the known outputs for the validation data.

In some embodiments, while model generator 120 generates the sequence of secondary models, hyper-parameter optimizer 130 may tune the newly trained models, and an accuracy estimator (such as accuracy estimator 436), may evaluate the models with validation data. This distribution of operations may expedite the process of obtaining samples for the plurality of datasets and the plurality of model types. This process is further described in connection with FIG. 8.

In step 716, based on the secondary models and their estimated accuracy, optimization system 105 may identify a minimum viable model from each sequence of secondary models. The minimum viable model may include the model that uses the smallest training dataset, identified from the progressively smaller datasets, and still achieves the desired accuracy threshold as evaluated in step 718. For example, with three data categories and four model types, optimization system would identify at least twelve minimum viable models, one for each category data profile and each type of model generated from the category data profile.

In step 718, optimization system 105 may determine a required number of samples for the minimum viable models. For example, based on the minimum viable model from the secondary model sequence, optimization system 105 may determine that for a CNN trained with data from the monthly data category at least 20 million samples are required. Additionally, optimization system 105 may determine that for an RNN trained with data from the yearly data category to achieve a 99% accuracy, at least 10 million samples are necessary. In some embodiments, determining the required number of samples may involve performing statistical analysis of multiple minimum viable models. For example, instead of a single CNN per data category, optimization system 105 may generate multiple CNNs for each data category. In such embodiments, the samples required for the target accuracy may be estimated by taking an average of samples required for the minimum viable models in the secondary sequences of models and determine their variation. Then, the determination of a required number of samples may be based on the mean, mode, or median for the minimum viable models. Similarly, in step 718 optimization system 105 may determine the ideal configuration of hyper-parameters for the minimum viable models. Optimization system 105 may identify the tuned hyper-parameters of the minimum viable model in each sequence of secondary models and/or make an statistical estimation for the number of tuned hyper-parameters that result in the best accuracies.

In some embodiments, in step 718 optimization system 105 may modify the determined minimum number of samples based on the effects of data variations on accuracy of the models. For example, the reduced training datasets may be convoluted by applying a convolution in the dataset. Alternatively, or additionally, optimization system 105 may include data scrambling to obfuscate data. For example, a user-configured or pre-seeded configuration may be used to modify the data. Then, based on the effect on the models based on the modifications, the minimum data requirements determined in step 718 may be adjusted. For example, if the model changes significantly with minor variations in the dataset, the minimum number of samples may be increased by one order of magnitude to compensate for potential variations. Alternatively, if variations in the training dataset does not affect the model outcome, the minimum number of samples may be taken from the first sample model.

In step 720, optimization system 105 may generate a database entry that associates the data category, model type, number of samples, and tuned hyper-parameters. For example, optimization system 105 may generate an entry in databases 180 to correlate the category data profile with the information from the corresponding minimum viable model. Alternatively, or additionally, optimization system 105 may store the information for minimum viable models in local memories, such as model memory 350. For example, based on the minimum viable model an entry in databases 180 may indicate that for a CNN, trained with a category data profile that resembles hourly transactions, and targeting an accuracy of at least 98%, 1 million samples are required for training and 200 thousand samples are required for validation. This information may be further complemented with the configuration of tuned hyper-parameters that resulted in the highest accuracy. For example, the entry in database 180 may additionally include the configuration for Learning rate, Number of epochs, Batch size, Activation function, and Number of hidden layers and units, used for the minimum available secondary model based on the CNN.

Figure 8:
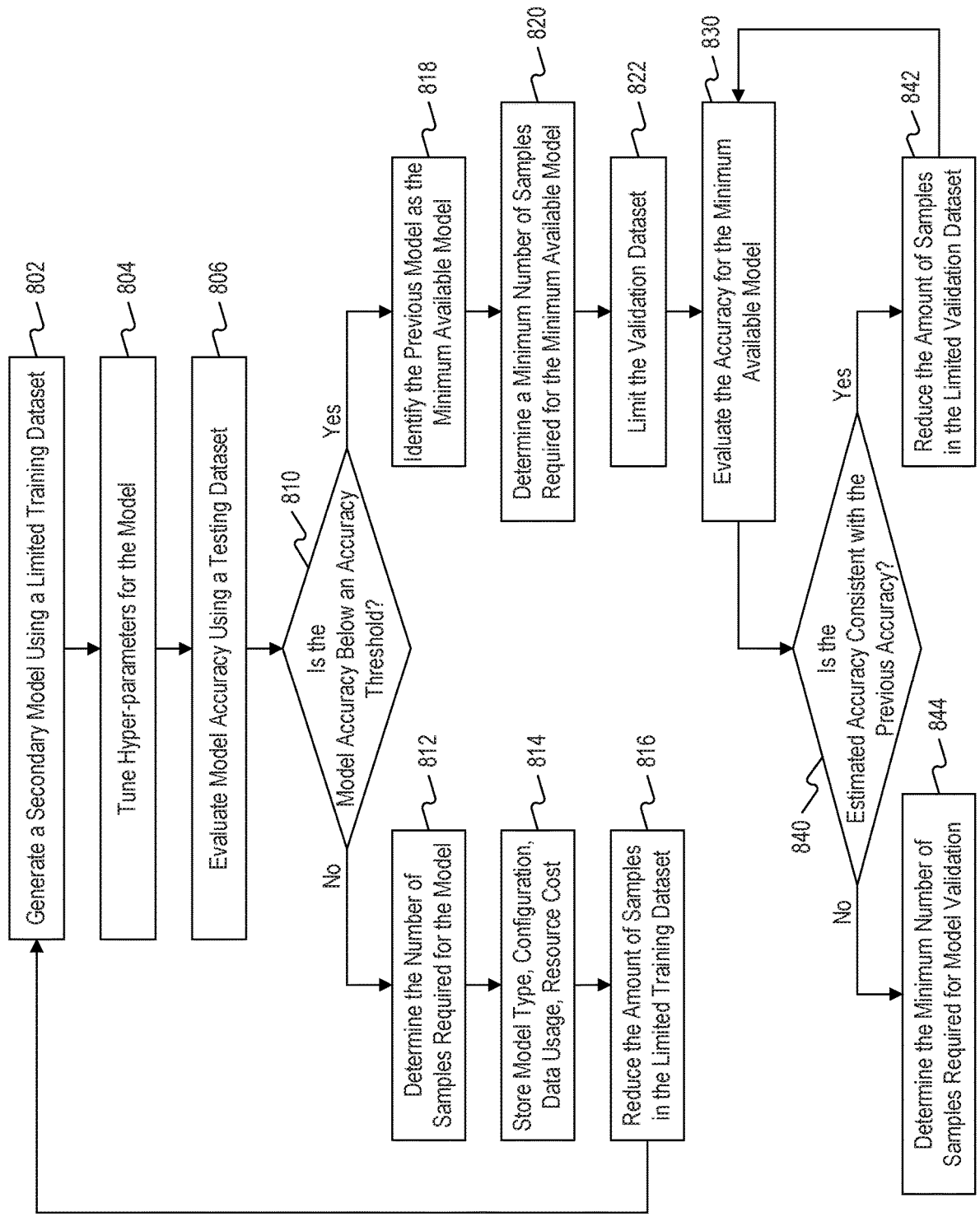
FIG. 8 is an exemplary flow chart illustrating a sample size requirement determination process, consistent with disclosed embodiments.

FIG. 8 shows a flow chart illustrating an exemplary sample size requirement determination process 800, consistent with disclosed embodiments. In some embodiments, process 800 may be carried out by optimization system 105 (FIG. 1). In such embodiments, process 800 may be carried out between model generator 120 and hyper-parameter optimizer 130. Process 800 may be employed to determine the minimum number of samples required for training and validation of a model while sustaining a target accuracy.

In step 802, optimization system 105 may generate a secondary model for the sequence of secondary models with progressively less data of step 710 (FIG. 7). For example, optimization system 105 may generate a secondary model for a CNN using a limited training dataset that only utilizes 50% of the total available data.

In step 804, optimization system 105 may tune the hyper-parameters of the model generated. For example, when the secondary model is a random forest, in step 804 optimization system may apply a grid search to manipulate the following hyper-parameters:

n_estimators=n of trees;
max_features=max number of features considered for splitting a node;
max_depth=max number of levels in each decision tree;
min_samples_split=min number of data points placed in a node before splitting;
min_samples_leaf=min number of data points allowed in a leaf node;
bootstrap=method for sampling data points (with or without replacement).

As the hyper-parameters are evaluated, optimization system 105 may evaluate the model accuracy using a testing dataset in step 806. For example, when the model generated is a linear regression associating credit card transactions with payment defaults, optimization system 105 may evaluate the accuracy of the model using a validation dataset that includes information about transactions and default instances. For example, in step 806 optimization system 105 may determine that the secondary model generated based on a CNN has an accuracy of 90% based on the validation data.

In step 810, optimization system 105 may determine if the estimated model accuracy is below or above an accuracy threshold. The accuracy threshold may be defined by a user. For example, a user may determine that models generated should have an accuracy of at least 98%. Alternatively, the accuracy threshold may be defined by an organization. If the model accuracy is not below the threshold (step 810: No), the trained model is still a viable model, even though it was generated with a limited training dataset. Thus, optimization system 105 may continue to step 812 and determine the number of samples required for the model. Further, in step 814 optimization system may store the model associating the model type, configuration, the size of the sample dataset, tuned hyper-parameters, and/or the computational cost to generate the model. For example, optimization system 105 may create an entry in databases 180 with this information. Because the model generated is still viable, the training data sample could still be further reduced to more efficiently create the model with negligent performance detriment. In step 816, optimization system 105 may further reduce the training dataset to generate a new secondary sample model and test whether a model with smaller training dataset is still viable. For example, if the limited training dataset in step 802 was 50% of the total available training data, in step 816 optimization system 105 may reduce the training dataset to 25% of the available training data and return to step 802 to generate a new secondary model using the smaller training dataset.

However, if in step 810 optimization system 105 determines the model accuracy is below an accuracy threshold (step 810: Yes), optimization system 105 may have found a model that is no longer viable. Thus, the previous iteration with less data is the minimum available model for the corresponding sequence of secondary models. In such embodiments, optimization system 105 may continue to step 818 and identify the previous model in the sequence of secondary models as the minimum available model. In step 820, optimization system 105 may determine the minimum number of samples required for the minimum available model and store the information in databases 180. For example, in some embodiments optimization system 105 may create a pointer to the database entry generated in step 814 to identify the minimum viable model information.

Once the training data requirements for the minimum available model have been identified, the model generation process can be further simplified if the validation dataset is also reduced. In step 822, optimization system 105 may limit the validation dataset. For example, if the validation dataset for the secondary model initially includes two thousand samples, in step 822 optimization system 105 may restrict the validation dataset to only two hundred samples. In step 830, optimization system 105 may evaluate the accuracy of the minimum viable model using the limited validation dataset. If despite the validation dataset being reduced the accuracy estimation is consistent with the estimation evaluated with the larger validation dataset (step 840: yes), the model generation may be simplified by reducing the validation dataset size without undermining the systems performance. Optimization system 105 may continue to step 842 and reduce the number of samples in the limited validation dataset. For example, the validation dataset may be reduced from two hundred to only one hundred samples and optimization system 105 may return to step 830 to evaluate the accuracy of the minimum viable model with the further reduced validation dataset.

However, if optimization system 105 determines that the estimated accuracy is inconsistent with the estimation based on the complete validation dataset, optimization system 105 may determine that the validation dataset cannot be reduced. For example, if the accuracy estimation is different from the one obtained with the complete validation dataset and/or there are higher variations between different estimation runs, optimization system 105 may determine the validation dataset should not be limited. Optimization system 105 may continue to step 844 and determine the number of samples required for validation based on the previous validation dataset. For example, if the validation is inconsistent with two hundred samples compared with a validation done with two thousand samples, then optimization system may determine that the minimum number of samples required for model validation is two thousand samples.

Sample size requirement determination process 800 enables the determination of the minimum number of samples required for training and validation of sample models. While the above process describes the evaluation of a single model, optimization system may replicate this process for multiple models and then perform statistical analysis to determine the number of samples that is required for training and validation. For instance, process 800 may be done for hundreds of CNNs. Then, the number of samples required for training and for validation may be determined by performing statistical analysis, such as taking the mean or the median, with the minimum samples estimated for the hundreds of models.

Figure 9:
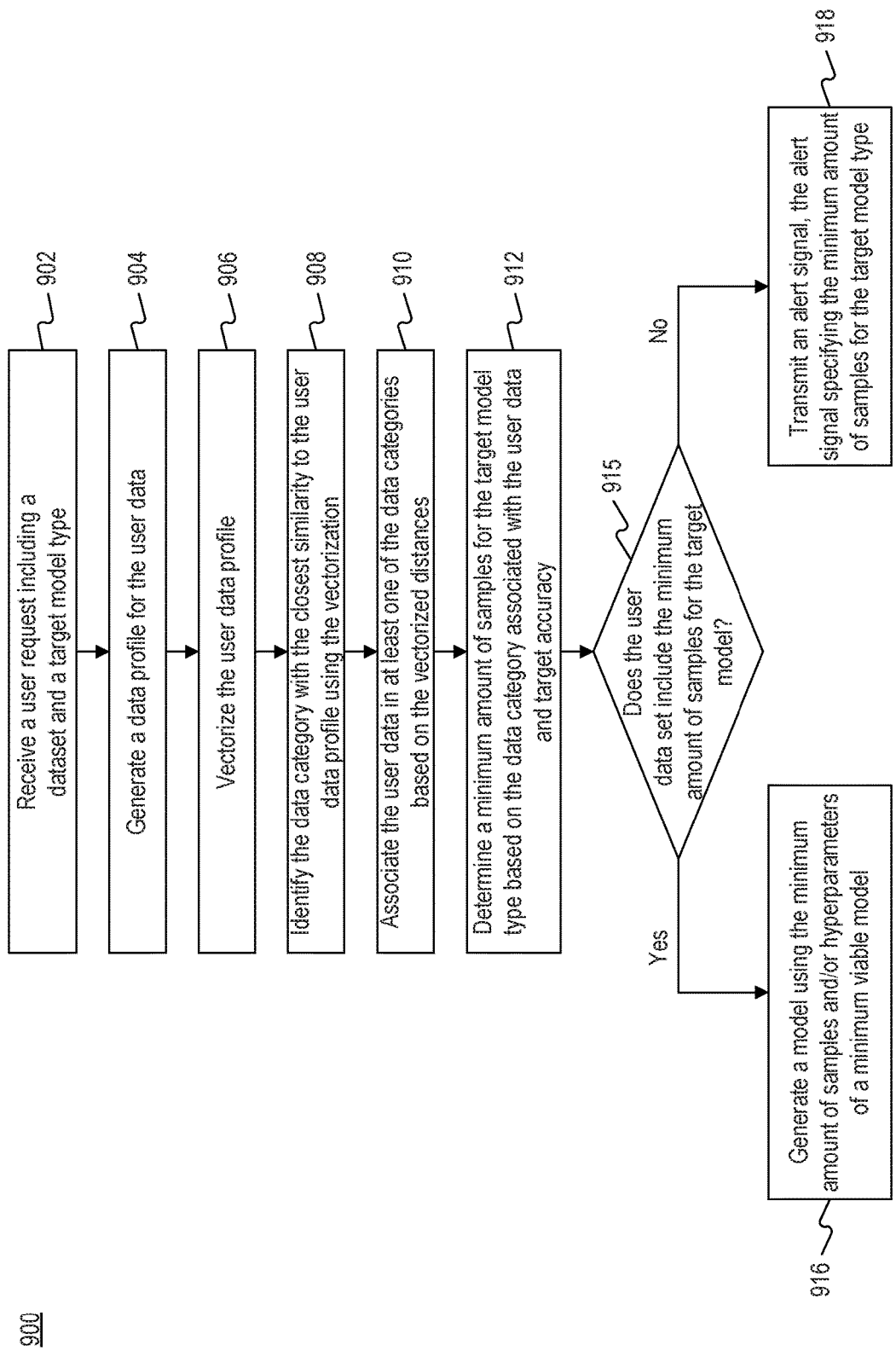
FIG. 9 is an exemplary flow chart illustrating a new model request evaluation process, consistent with disclosed embodiments.

Referring now to FIG. 9, there is shown a flow chart of an exemplary new model request evaluation process 900, consistent with disclosed embodiments. Evaluation process 900 may be carried out by optimization system 105 (FIG. 1). In some embodiments, evaluation process 900 may be performed by data profiler 110 and model generator 120 (FIG. 2).

In step 902, optimization system 105 may receive a user request to generate a new model. The user request may include user data for training the new model. The user request may also include a target model type and user parameters, such as the desired accuracy. For example, the user request may include a ZIP folder with user data and a selected target model type, such as an RNN selection. Alternatively, the request may include an address in a database for the user data. For example, the request may include an address in databases 180 that stores the user data or may include an address in online resources 140 that store the user data.

In step 904, optimization system 105 may generate a user data profile for the user data. In some embodiments, data profiler 110 may identify key features of the user dataset to generate a profile. For example, using data profiler 110 optimization system 105 may identify a periodicity of the user dataset, identifying peaks and valleys in different dimensions, and/or other statistical features such as the mean of a variable, the mode, or the median. Such information may be used to vectorize the user data profile and generate a representation of the dataset with a vector in step 906. For example, in step 906 optimization system 105 may apply a series of linear transformations to generate vectors that associate the values from the user data profile into pairs of values. Additionally, or alternatively, step 906 may generate multiple vectors creating a multi-dimensional vectorization for the user data profile.

In step 908, optimization system 105 may identify a sample data category with the closest similarity to the user data profile. In some embodiments, databases 180 may include a plurality of sample datasets, each dataset being associated with a data profile and an associated vectorization. In such embodiments, optimization system 105 may compare the data profile of the user dataset as generated in step 904 with the data profile of the sample dataset. For example, if the user dataset includes samples with an hourly periodicity, in step 908 optimization system 105 may identify that the user dataset is similar with datasets of hourly records of transactions. Alternatively, the similarity between the user dataset and the sample datasets may be identified by comparing variations in the data. For example, if the user dataset has ample variations that result in a large standard deviation between records, optimization system 105 may identify that the user dataset is similar with datasets of highly fluctuant transactions.

In step 910, to quantify the similarity between datasets, optimization system 105 may associate the user datasets with at least one of the data categories based on vectorized distances. For example, optimization system 105 may compare vectors associated with the different data profiles. Then, as described in further detail in connection with FIG. 10, the distance between vectors or their correlations may be computed to determine which one is the closest data category for the user data.

In step 912, optimization system may determine a minimum number of samples for the target model requested in step 902 using the user data as the training dataset. Once optimization system 105 identifies the data profile of the user data is related to a data category, such as the ones determined for step 704 (FIG. 7), optimization system 105 may request information about minimum data requirements for sample models. In some embodiments, step 912 may involve retrieving, from database 180, a minimum number of samples for the data profile based on: the data profile most closely related to the user data profile, and the target model type. For example, if in step 910 optimization system associated the user data with a monthly data profile, in step 912 optimization system may review the minimum required number of samples for viable models identified in process 800. Because the data profiles are similar, it is possible to estimate that the sample models would behave similarly to the user data, allowing the determination of minimum data requirements for the user requested model based on the sample models. For example, if the user requested a CNN with 98% accuracy and the user data indicates the data profile similar to yearly transactions, optimization system 105 may identify the minimum viable model for a CNN based on sample models created with yearly data profiles that achieve a 98% accuracy. Because the data profiles are similar and the user is requesting a CNN, the minimum data requirements for viable models and the tuned hyper-parameters discovered for the sample CNN could be applied, at least as a starting point, to the new dataset. This estimation of minimum number of samples required for the target model may save resources and improve efficiency in the generation of machine-learning models.

In step 915, optimization system 105 may compare the user dataset with the minimum number of samples for the target model. If the user dataset exceeds the minimum number of samples (step 915: yes), optimization system 105 may continue to step 916 and generate the target model requested by the user by generating a user model of the target model type. For example, model generator 120 may be instructed to generate the target model using the user dataset. In some embodiments, the user dataset may be limited to have only the minimum number of samples. In this way, optimization system 105 may save computing resources by avoiding processing too much training data. Alternatively, the user dataset may be limited for training to be within one standard deviation from the minimum number of samples. Further, in some embodiments, optimization system 105 may generate a model for the user by re-training models using the complete user dataset, but keeping the same hyper-parameters as the sample models.

However, if the user dataset has less samples than the minimum number of samples (step 915: no), optimization system 105 may continue to step 918 and transmit an alert signal to the user by generating a notification for the client device when determining the user dataset does not comprise the minimum number of samples. For example, optimization system 105 may transmit an alert signal to client devices 150. The alert signal may identify the minimum number of samples that would be required according to the identified sample model that was identified based on the proximity of the client devices. For example, if a user sends a request for a random forest with a dataset that includes 100 samples but optimization system 105 identifies that at least 1000 samples are required for the user's target accuracy, optimization system 105 may generate an alert or recommendation specifying that, based on the user data profile, at least 1000 samples are required for a random forest to achieve the required accuracy.

Figure 10:
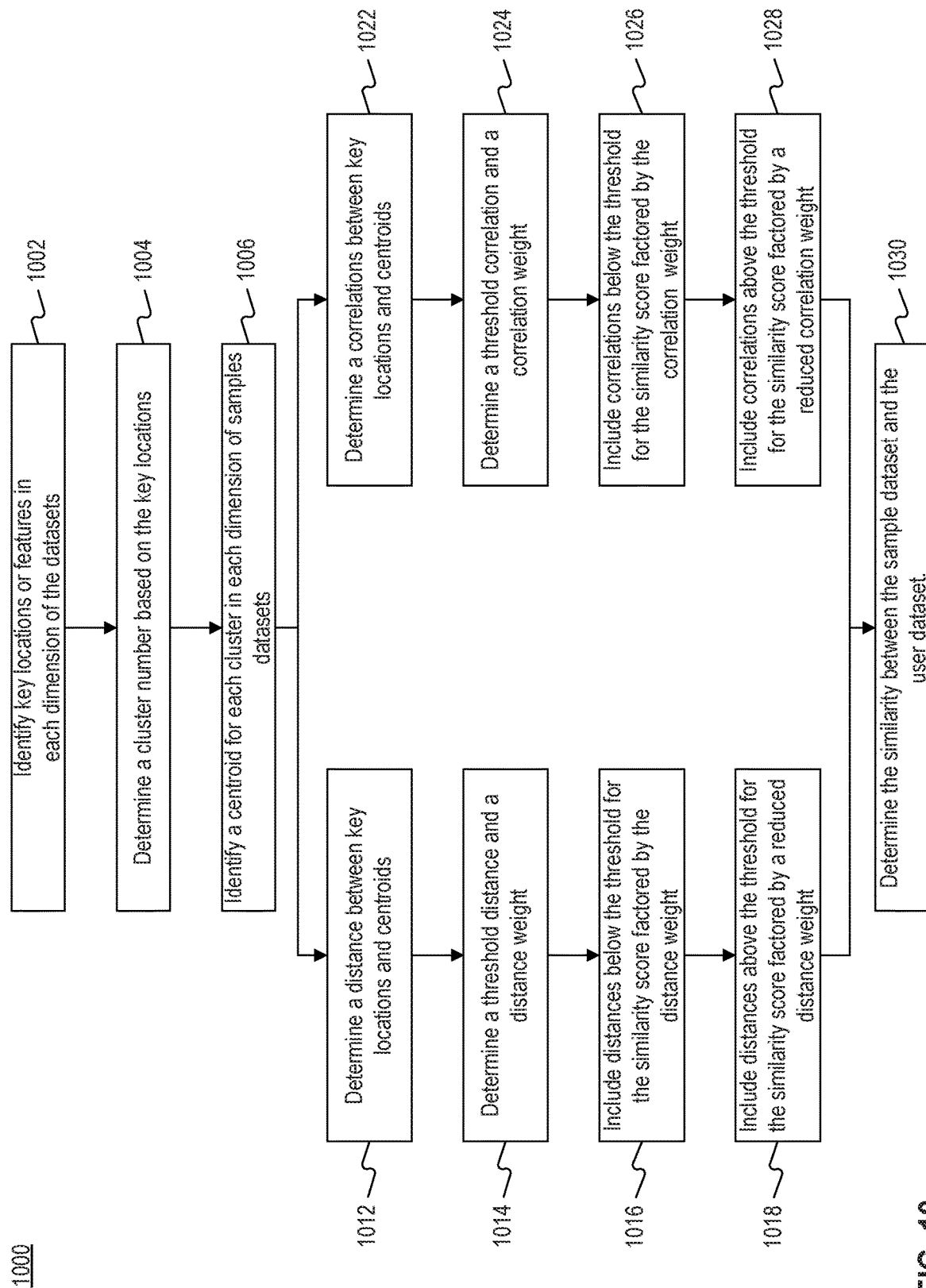
FIG. 10 is an exemplary flow chart illustrating a similarity score calculation process, consistent with disclosed embodiments.

FIG. 10 shows a flow chart of an exemplary similarity score calculation process 1000, consistent with disclosed embodiments. In some embodiments, optimization system 105 may carry out process 1000. For instance, in some embodiments, process 1000 may be performed by data profiler 110. In such embodiments, process 1000 may be used to identify and compare similarities between datasets.

In step 1002, optimization system 105 may identify key locations or key features in different dimensions of a dataset. For example, optimization system 105 may take one of the data categories, as categorized in step 702 (FIG. 7), and identify peak locations in each dimension. For example, optimization system 105 may identify the mode of a variable in each dimension of the dataset or the average value. Alternatively, key features of the dataset like periodicity, standard deviation, or shape of the surface may be calculated and identified in step 1002. In some embodiments, for the key location or key feature identification, optimization system 105 may create a family of histograms for different dimensions of the dataset.

In step 1004, optimization system 105 may determine a cluster based on the key locations or features to generate multi-dimensional vectors. For example, optimization system 105 may evaluate the number of peaks in each dimension and set the cluster number of clusters as the maximum number of peaks for each dimension. Alternatively, or additionally, optimization system 105 may identify features that can be clustered to profile the dataset. For example, periodicity may be identified from the dataset when it is processed with a Fast Fourier Transform. Then, optimization system 105 may determine a number of clusters for periodic variables or values in the frequency domain.

In step 1006, optimization system 105 may identify a centroid for each cluster in each one of the dimensions. This centroid can be determined with weighted techniques to determine the center of mass of the group. In some embodiments, optimization system 105 may find the centroid by computing a weighted average of points in the cluster with weights being assigned based on the intensity of the peak of particularity of the feature. For example, transactions performed frequently at midnight, may be considered more unique and being assigned a higher weighted average. Alternatively, or additionally, the centroid may be identified in each cluster by minimizing the sum-squared distance from other points in each one of the clusters. In other embodiments, optimization system 105 may determine cluster centroids using k-means algorithm to partition the dataset in multiple clusters.

Once centroids of sample datasets and key locations and features have been identified for the user dataset, optimization system 105 may start a process to determine a similarity score between datasets. The similarity score may be based on distances between the vectorized features, correlations between the vectorized features, or as shown in FIG. 10, by combining both distances and correlations.

In some embodiments, steps 1012-1028 and steps 1022-1028 may be performed in parallel. In other embodiments, optimization system 105 may select one of branches shown in FIG. 10. In step 1012, optimization system 105 may determine a distance between vectorized locations of the user dataset and the centroids for each dimension of the sample datasets. The distance may be computed as the Manhattan distance between coordinates of the vectors associated with the data and/or based on Euclidian distances. For example, the distance may be computed using:

```
manhattan_distance(sample):
    distance = 0
    for x in xrange(3):
        for y in xrange(3):
            value = sample[x][y]
            x_value = x, y_value = y, x_goal = ...?, y_goal = ...?:
            distance += abs(x_value – x_goal) + abs(y_value –
            y_goal)
return distance
```

In step 1014, optimization system 105 may determine a threshold distance and a distance weight. When the distance between the key features or locations is lower than a threshold distance, it may represent the key location of the user dataset is related to the sample dataset and a first weight is assigned to the distance. In step 1016, distances below the threshold may be included in a similarity score. However, distances that are above the threshold may be less related to the sample data.

In some embodiments, key locations or features that are further away from the centroid cluster may be discarded. However, in other embodiments, as shown in FIG. 10, in step 1018 optimization system 105 may include distances above the threshold for the similarity score but being modified by a reduced weight to reduces the influence of this key location or factor in the overall similarity score. For example, the similarity score may be expressed as:

Similarity Score=$\Sigma_{k=0}^{n}(w1_k * d_k) + \Sigma_{k=0}^{m}(w2_k * d_k)$ where 'w1' represents the weight assigned to locations within the threshold distance of the centroid, 'w2' represents the weight assigned to locations outside the threshold distance from the centroid, the estimated distance, 'n' represents the number of vectors within the threshold distance, and 'm' represents the number of vectors outside the threshold distance.

In addition to determining similarity using the distance between vectors, the similarity score may also be adjusted by evaluating correlations between the centroid and key features or locations of the user dataset. For example, optimization system 105 may determine the correlation between locations and centroids by estimating correlation using Pearson R correlation measures. For example, optimization system 105 may estimate correlation between objects of the user dataset and the sample cluster by computing correlation as $$\text{Correlation} = \frac{\Sigma(o_1 - \underline{o_1})(o_2 - \underline{o_2})}{\sqrt{\Sigma(o_1 - \underline{o_1})^2 \times \Sigma(o_2 - \underline{o_2})^2}},$$

where ($\underline{o_1}$) and ($\underline{o_2}$) are the mean of attribute values $o_1$ and $o_2$. Thus, in step 1022 optimization system 105 may determine correlations between key locations and centroids.

Similar to the assessment for distances between vectors, in step 1024 optimization system 105 may determine a threshold correlation and correlation weights. Optimization system 105 may include correlations below the threshold in the similarity score factored with a large weight when they are below the threshold in step 1026, but include them with the correlation factor with a reduced weight when the similarity score is above the threshold.

In step 1030, optimization system 105 may combine the correlation values and the distance values in a single similarity score to assess the similarity between two datasets. For example, optimization system 105 may determine a similarity score with four parts: distances below a threshold distance factored by a first weight, distances above the threshold distance factored by a second weight, correlations below a threshold correlation factored by a third weight, and correlations above a threshold correlation factored by a fourth weight. Mathematically these similarity score between datasets may be expressed as:

Similarity Score=$\Sigma_{k=0}^{n}(w1_k * d_k) + \Sigma_{k=0}^{m}(w2_k * d_k) + \Sigma_{k=0}^{x}(w3_k * c_k) + \Sigma_{k=0}^{y}(w4_k * c_k),$ where 'w1' represents the weight assigned to locations within the threshold distance of the centroid, 'w2' represents the weight assigned to locations outside the threshold distance from the centroid, 'd' the estimated distance, 'n' represents the number of vectors within the threshold distance, 'm' represents the number of vectors outside the threshold distance, 'w3' represents the weight assigned to locations with a correlations to the centroid below a threshold, 'w4' represents the weight assigned to locations with correlations above the threshold correlations, 'x' represents the number of vectors within the threshold correlation, 'y' represents the number of vector outside the threshold correlation, and 'c' represents the estimated correlation. The estimated similarity score may be used for selecting one of the data categories associated with one of the category vectors having the smallest distance or highest similarity score. With this process optimization system 105 may be used to identify the data category most closely related to the user data profile.

In some embodiments, optimization system 105 may apply process 1000 when receiving a user dataset to determine which one is the closest data profile and facilitate making the minimum data requirement prediction. For example, optimization system 105 may apply process 1000 in step 908 (FIG. 9) to resolve the data category with the closest similarity to the user data profile.

Figure 11:
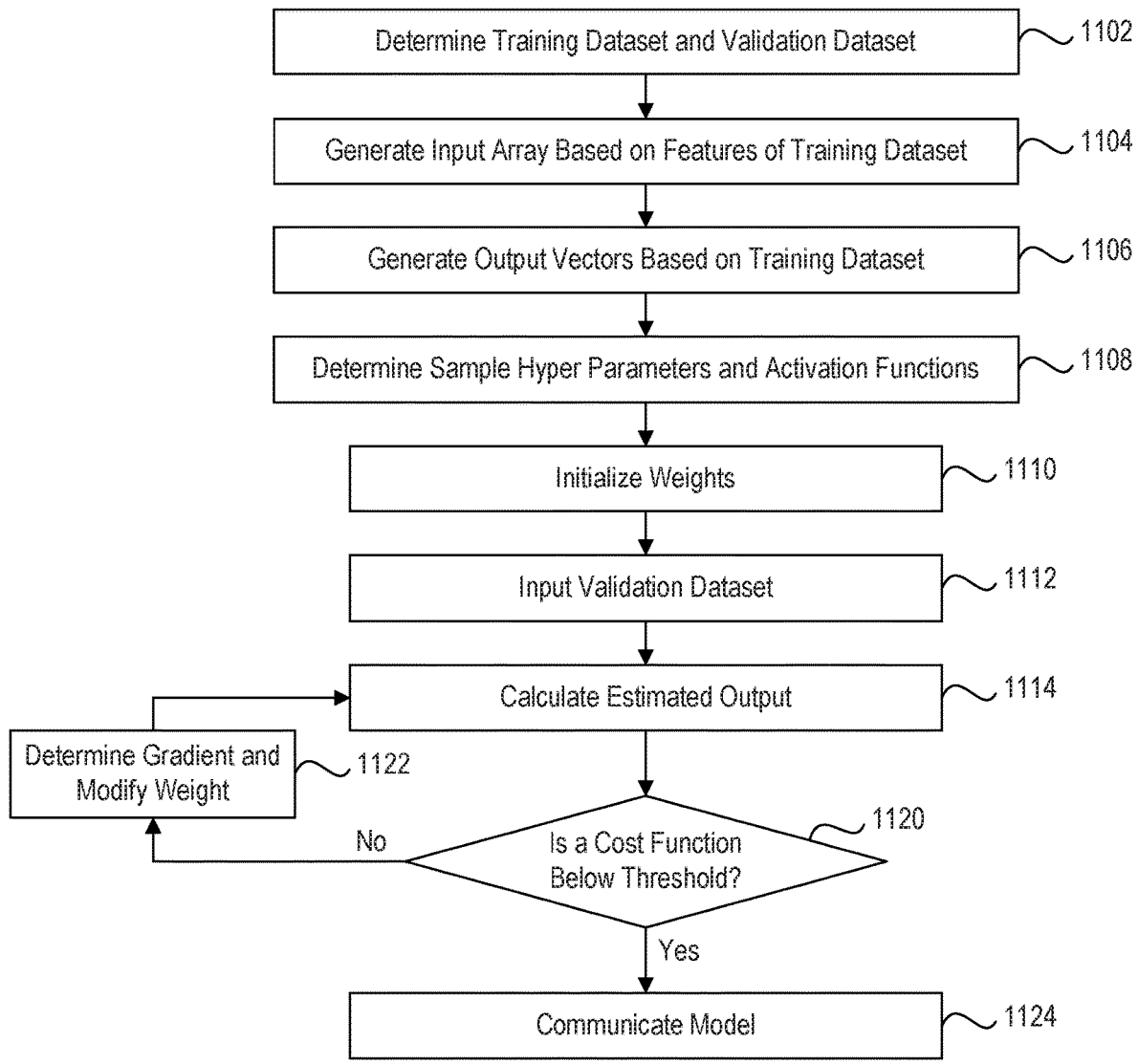
FIG. 11 is an exemplary flow chart illustrating a process for generating a predictive model, consistent with disclosed embodiments

Referring now to FIG. 11, there is shown a flow chart of an exemplary process 1100 for generating an machine-learning model, consistent with disclosed embodiments. Process 1100 may be performed by optimization system 105. For example, process 1100 may be executed by model builder 346 in model generator 120 (FIG. 3) and may be configured to generate machine-learning models, such as neural networks.

In step 1102, optimization system 105 may determine a training dataset and a validation dataset. For example, optimization system 105 may partition sample or user datasets into a training and a validation portions. In such embodiments, optimization system 105 may receive data including a plurality of transaction records, such as debit or credit card transactions, and/or a plurality of user credit score records. The transactions and records may be associated with metadata describing attributes of the associated user. Optimization system 105 may divide the transaction records and generate two groups, one to train the predictive machine-learning model and a second to validate the model.

In step 1104, optimization system 105 may generate an input array based on features of the training dataset. For example, optimization system 105 may generate a variable including feature information of transactions and/or records in the training dataset.

In step 1106, optimization system 105 may generate output vectors based on metadata of the training dataset. For example, based on the transactions in the training dataset, the identification system may generate a desired output vector making a prediction of, for example, likelihood of payment default based on transactions included in the training dataset.

In step 1108, optimization system 105 may determine sample hyper-parameters and activation functions to initialize the model to be created. For example, optimization system 105 may select initial hyper-parameters such a number of layers and nodes, and determine whether the network will be fully or partially connected. In addition, in step 1108 optimization system 105 may determine the dimensionality of the network and/or determine stacks of receptive field networks. Moreover, in step 1108 optimization system 105 may also associate the model with one or more activation functions. For example, optimization system 105 may associate the model with one or more sigmoidal functions. In step 1110 optimization system 105 may initialize weights for synapsis in the network.

In step 1112, optimization system 105 may input a validation dataset in the model. For example, optimization system 105 may apply the input array based on features of training dataset of step 1104 to calculate an estimated output in step 1114 and a cost function. In step 1120, optimization system 105 may determine whether the cost function is below a threshold of required accuracy, which may be specified by the user. If optimization system 105 determines that the cost function is not below a threshold and the required accuracy has not being achieved, optimization system 105 may continue to step 1122 and modify model parameters. For example, when generating a neural network, in step 1122 optimization system 105 may determine a gradient to modify weights in synapses or modify the activation functions in the different nodes. However, if the cost function if below a threshold (step 1120: yes), identification system may accept and communicate the model in step 1124.

Figure 12:
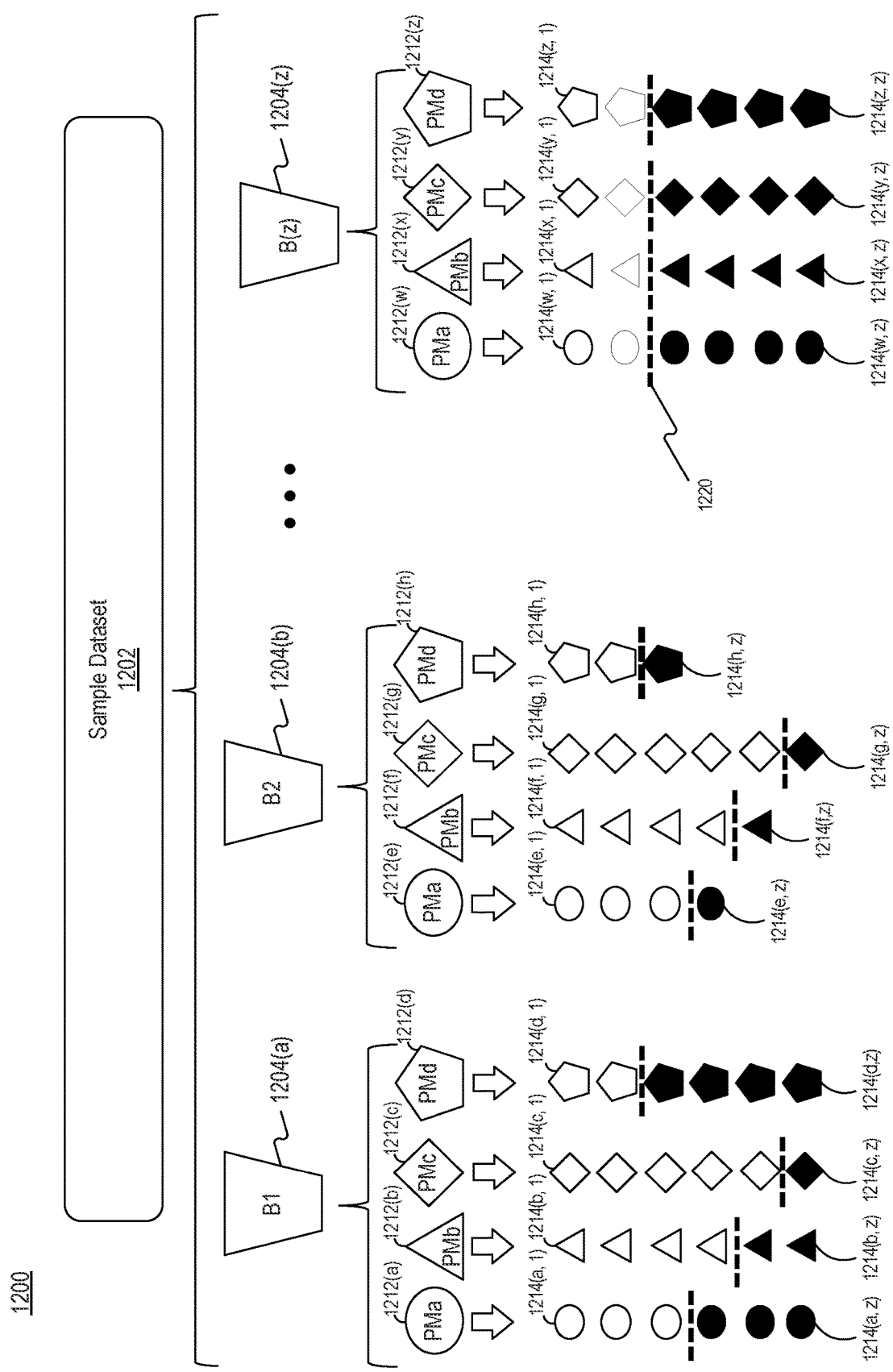
FIG. 12 is an exemplary schematic showing a representation of the generation of sample models, consistent with disclosed embodiments.

Referring now to FIG. 12, there is shown an exemplary schematic representation of the generation of sample models, consistent with disclosed embodiments.

FIG. 12 shows that from a sample dataset 1202 multiple sample data buckets or sample categories 1204(a)-1204(z) are generated. For example, dataset 1202 may include a plurality of credit card transactions. These transactions may be categorized in different sample categories 1204 based on some characteristics. For example, the credit card transactions may be categorized based on the type of originating merchant, having sample category 1204(a) for grocery stores, sample category 1204(b) for restaurants, etc. Alternatively, the categorization may be done based on geographic considerations and/or features of the records. For example, sample category 1204(a) may be dedicated for credit card transactions organized by every hour, while sample category 1204(b) may be dedicated for transactions organized yearly. In some embodiments, sample categories 1204 may be independent and do not share any samples. In other embodiments, however, sample categories 1204 may share some samples and be classified based on different parameters. In some embodiments, sectioning sample dataset 1202 into sample categories 1204 may be based on non-overlapping bands of information. Further, in such embodiments sample categories 1204 may not share samples. The categorization of data is further discussed in connection with step 704 (FIG. 7).

Literals used to reference individual elements in FIG. 12, e.g., (a), (b), or (z), do not specify the number of an element or the total number of elements. Instead, they are variable references that indicate a variable element number and a variable number of total elements. For example, literal (z) used to reference sample category 1204(z) does not indicate that category (z) is the $26^{th}$ memory unit. Instead, (z) is a variable reference that could indicate any integer number. Therefore, sample category 1204(z) is any one of sample categories 1204. Similarly, literals (a) and (b) used to reference, for example, primary model 1212(a), are also variable references that do not indicate or limit the element number or the total number of elements.

As shown in FIG. 12, from each one of sample categories 1204, a plurality of machine-learning primary models 1212 may be generated by training and validating them using data samples from sample category 1204(a). Primary models 1212 may have different model types. For example, primary model 1212(a) may be a CNN, primary model 1212(b) may be a linear regression, primary model 1212(c) may be a random forest, and primary model 1212(d) may be an MLP. Additional models may be possible and in some embodiments the primary models 1212 may include repeated model types. For example, multiple RNNs may be formed based on sample category 1204(a). As shown in FIG. 12, the generation of primary models 1212 may be repeated for each one of the sample data categories 1204, creating a plurality of different types of machine-learning primary models 1212, for each one of the sample categories 1204.

While FIG. 12 shows a representation in which the same number of type of models is generated for each one of the sample categories 1204, in some embodiments the model types in each sample category 1204 may be limited to a specific set. For example, optimization system 105 may decide to generate multiple model types from sample category 1204(a), but generate a single model type from data sample category 1204(b).

From the primary models 1212, a series of secondary models 1214 may be generated with progressively less training data to identify the minimum data requirements to train the machine-learning model. The variety of data that is created by categorizing data in different profiles allows the formation of multiple models with different category data profiles and different complexities. Thus, for each one of the primary models 1212 a series of secondary models, such as 1214(a, 1)-1214 (a,z) or 1214(b,1)-1214(b,z), may be generated with less data. For example, primary model 1212(a), trained with data from sample category 1204(a), may be retrained with progressively less data creating secondary models 1214(a,1)-1214(a,z). These models with less data are less expensive to produce because less training data is being processed. Moreover, tuning hyper-parameters in secondary models 1214 with reduced training datasets is also less expensive because tuning with less data reduces the complexity of the model and facilitates the iterations necessary for hyper-parameter tuning.

Hyper-parameters in each one of the secondary models 1214 may be tuned and then their accuracy may be evaluated by running a validation dataset through the tuned model. For example, optimization system 105 may apply process 800 to each one of the secondary models 1214, evaluating the minimum amount of training samples to get a viable model and the minimum number of samples that is required for validation of the model. Based on such accuracy thresholds, optimization system 105 may identify viable models and non-viable models. In FIG. 12, to depict a representation of these thresholds, secondary models 1214 filled in black, which fall below the threshold 1220, would be non-viable models. That is, secondary models 1214 below threshold 1220, represent models trained with a small training dataset, insufficient to achieve the desired accuracy. In contrast, the white secondary models 1214 (above the threshold 1220) are models that are viable because they reach the desired accuracy. In the representation of FIG. 12, secondary models 1214 above threshold 1220, represent the models that may be used to determine the minimum number of samples that is required for training the corresponding model type (e.g., based on the type of primary models 1212) and under the corresponding data sample category 1204 while achieving the target accuracy.

As shown in the graphical representation of FIG. 12, the sequence of secondary models 1214 may be generated with different processes. For some sample categories 1204, as shown for sample category 1204(a), a predetermined number of secondary models 1214 may be generated. For example, for each primary model 1212 a sequence of 100 secondary models 1214 may be generated. In other embodiments, the secondary models may be generated only until a non-viable model is identified in the sequence. This process, described in connection with FIG. 8, may reduce the amount of resources that is utilized for the generation of the secondary models 1214 and facilitate the identification of the minimum data requirements. In yet other embodiments, as shown for sample category 1204(z), secondary models 1214 may be uniformly identified as non-viable when a single secondary model 1214 from the category is identified as a non-viable model. Such strategy may yield estimations of minimum data requirements that are higher than necessary, but would reduce consumption of computing resources.

Secondary models 1214 may be used as comparables for new models. Secondary models 1214 may be used as sample models that provide information about the minimum data requirements for each sample category 1204 and each type of primary model 1212. In this way, when a new model requested based on a user dataset, optimization system 105 may associate the user dataset with one of the sample categories 1204 and estimate minimum data requirements for different model types.

Figure 13:
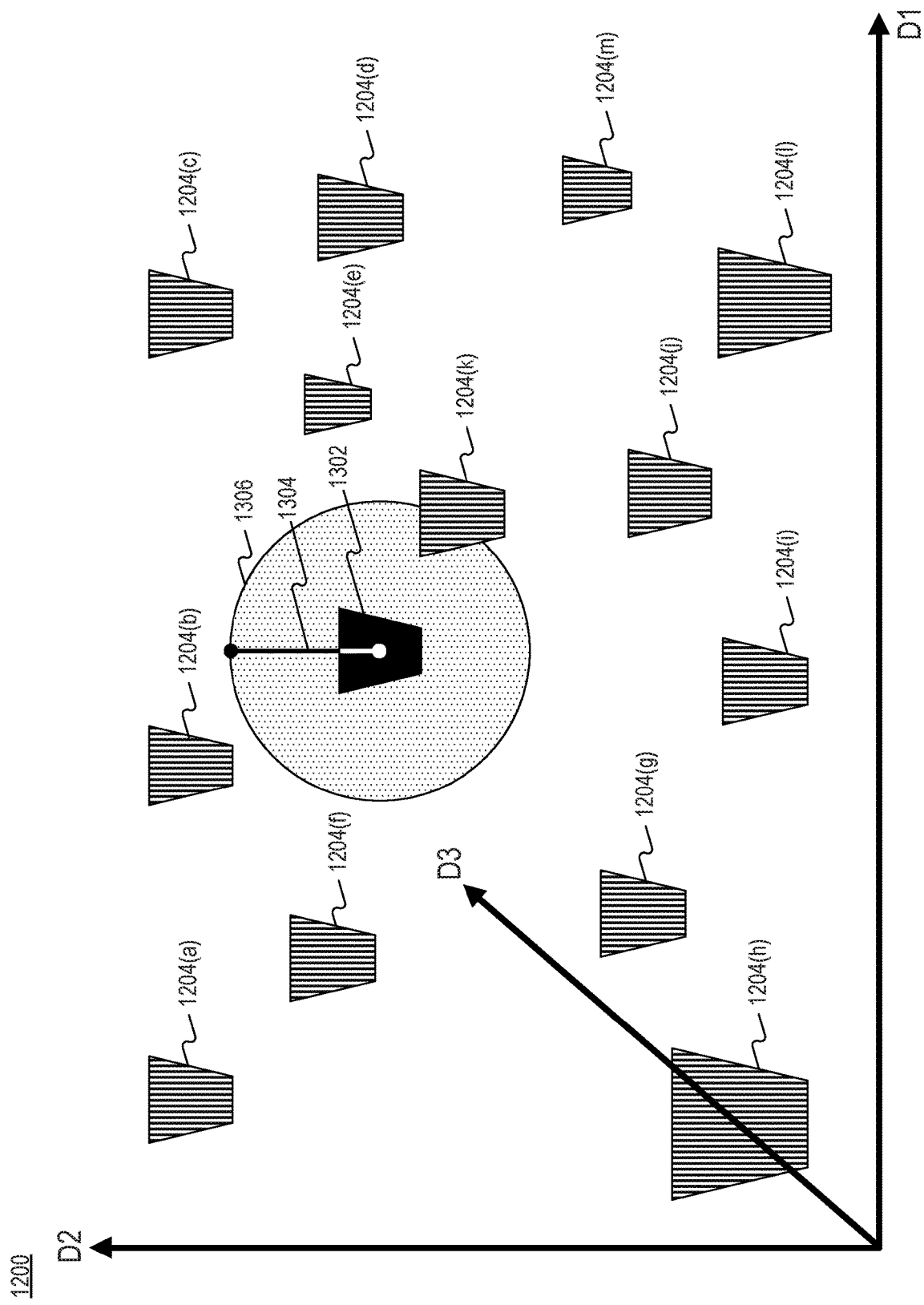
FIG. 13 is an exemplary schematic showing a representation of similarity of datasets in a multi-dimensional space, consistent with disclosed embodiments.

FIG. 13 shows an exemplary representation of similarity of datasets in a multi-dimensional space. FIG. 13 represents a three-dimensional space with a plurality of sample categories 1204(a)-1204(m) around a user data category 1302. In FIG. 13 the literals (a)-(m) do not represent a number of the object. Instead, they represent an integer variable. The representation in FIG. 13 shows how the similarity score, as described in FIG. 10, would enable identifying common category data profiles that facilitate determining which sample models can be used to determine minimum data requirements.

FIG. 13 shows that sample categories 1204 are placed in multiple places of the multi-dimensional space. Indeed, optimization system 105 may design the sample categories 1204 so they are spread in the multi-dimensional space and improve the probability of having a match between sample category data profiles and user data profiles. Sample categories 1204 surround the user data category 1302. However, it is unlikely to have an exact match between user data category 1302 and sample data categories 1204. A threshold distance 1304 from the user data category 1302 may determine sample categories 1204 that, even if not overlapping user data category 1302, are similar and/or closely related. Threshold distance 1304 shows a graphical representation of the similarity analysis that identify the data category with the closest similarity to the user data profile using the vectorizations, as described in step 908 (FIG. 9). Threshold distance 1304 may be determined by users. For example, threshold distance 1304 may be specified in the user request in step 902. Alternatively, threshold distance 1306 may be determined by an automated process in which the threshold distance is progressively increased until at least one sample category 1204 is within the threshold distance 1304. The threshold distance 1304 as displayed in FIG. 13 is only a graphical representation. In embodiments with multiple dimensions, threshold distance 1304 may have multiple dimensions and threshold distance may be similar to a Manhattan distance between datasets. Moreover, FIG. 13 is a simplified graphical representation showing only a distance measured from the center of user data category 1302. However, in other embodiments a plurality of distances may be measured from multiple features of the user data category 1302. For example, each one of the vertices from user data category 1302 may be used as a reference point for measuring the distance. In the dataset, this would mean that individual features of the dataset may be used to estimate similarity. For example, not only is the periodicity used to determine the threshold distance between data categories but, in addition, the data variation is used to identify similar categories.

FIG. 13 shows that threshold distance 1304 defines a user category surface 1306. In the multi-dimensional space, this user category surface 1306 delineates the portion of space within sample categories 1204 similar to the user data category 1302. In the exemplary graphical representation of FIG. 13, only sample category 1204(k) is within the user category surface 1306. Therefore, optimization system 105 may identify sample data category 1302(k) as the closest dataset to the user dataset. Then, optimization system 105 may use the sample primary models 1212 from sample category 1204(k). For example, optimization system 105 may use secondary models 1214(k,1)-1214(k,n), not shown in FIG. 12 but part of the sequence in FIG. 12, to estimate minimum data requirements for a user dataset.

By way of example, if user wants to build a CNN using a dataset with user data category 1304, optimization system may query sample secondary models 1214 that are generated with a sample category 1204 that is similar to user data category 1304 to estimate a minimum number of samples required for training, a minimum number of samples required for training, and tuned hyper-parameters for CNN model types. Identification of minimum data requirements may save resources during the generation of the new CNN model. For example, the process would prevent creating a model with insufficient data that result in a model without the data accuracy. The process could also reduce the computer expense of generating the model by reducing number of samples processed during CNN training and validation. Furthermore, the process may reduce expenses of tuning hyper-parameters by decreasing the model complexity and providing initial hyper-parameters that are likely be close to the optimized solution.

Although FIG. 13 shows only one sample category 1204 (k) within the user category surface 1306, in some embodiments multiple sample categories 1204 may be within the user category surface 1306. In such embodiments, weighted averages or other statistical methods may be employed to determine the minimum data requirements and hyper-parameters. For example, a weighted average that takes into account the distance between centroids of data categories may be used to estimate the minimum data requirements when there are multiple sample data categories within the user category surface 1306.

The graphical representation in FIG. 13 shows an embodiment for optimization system 105 may identify the data category with the closest similarity to the user data profile using the vectorization as in step 908 (FIG. 9) to facilitate the estimation of minimum data requirements for the user data, desired accuracy, and the targeted model type.

Figure 14:
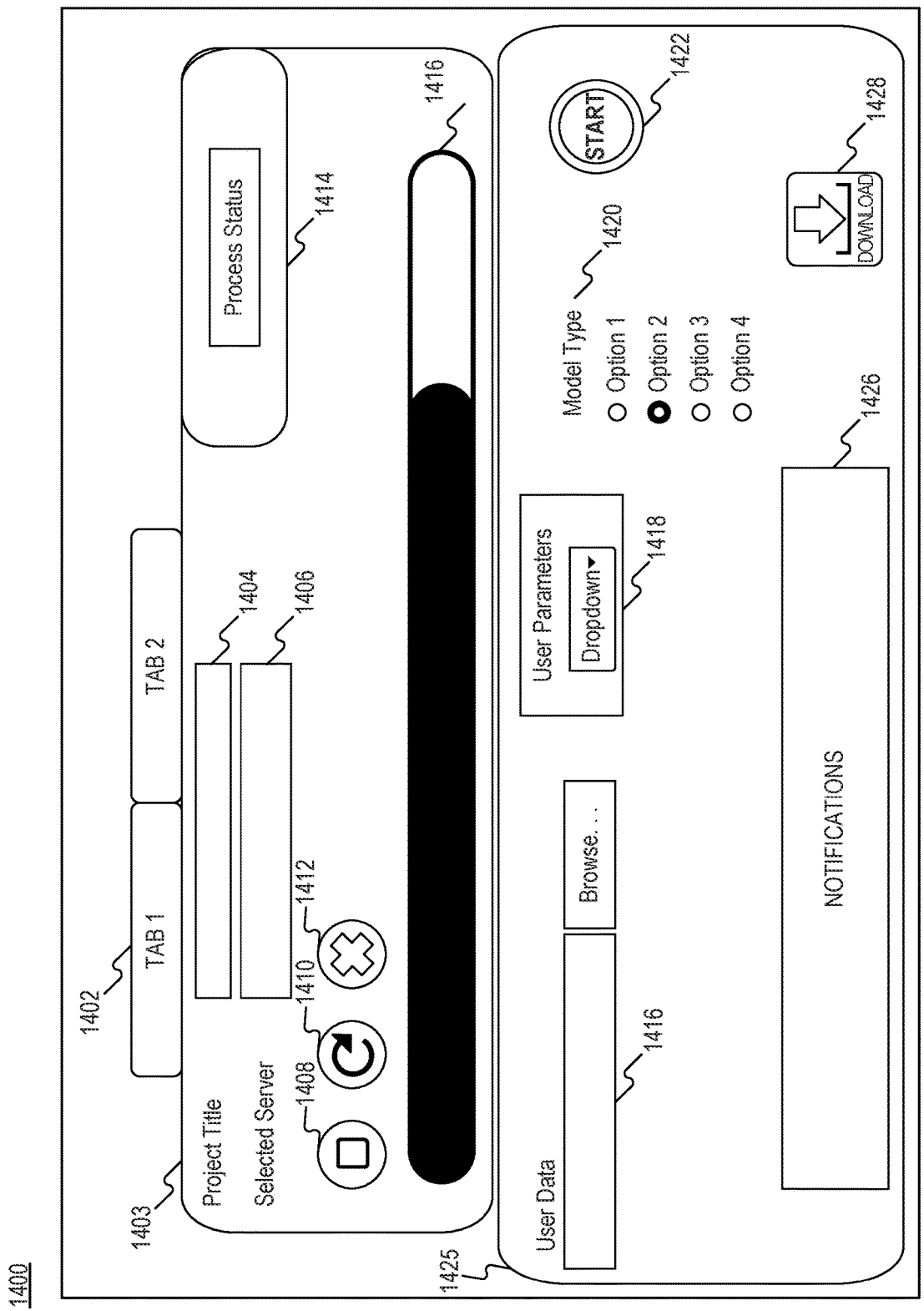
FIG. 14 is an exemplary graphical user interface showing a display of a website interface, according with disclosed embodiments.

Referring now to FIG. 14, there is shown an exemplary graphical user interface (GUI) of a website interface 1400. In some embodiments, interface 1400 may be displayed in client devices 150 that are interacting with optimization system 105 for estimating minimum data requirements. In such embodiments, optimization system 105 may generate interface 1400 and transmit it to client devices 150. Alternatively, or additionally, interface 1400 may be stored in online resources 140 or databases 180.

In some embodiments, interface 1400 may be displayed when a user accesses a website associated optimization system 105. For example, the user datasets and new model generation requests in step 902 (FIG. 9) may be received via interface 1400, which grants access to optimization system 105. Interface 1400 includes a status banner 1403 and a body section 1425.

In some embodiments, optimization system 105 may be configured to concurrently perform multiple tasks in parallel. For example, a user may request to concurrently generate a CNN model using credit card transactions as training data and a random forest using credit score records as training data. The user may send the requests using elements of body section 1425 and use tabs 1402 in interface 1400 to switch the display of status banner 1403 from one of the projects to another.

Status banner 1403 may also include a title text box 1404 and a selected server box 1406. Title text box 1404 may display the title of the project that is being generated. For example, the title may display a message such as "CNN using credit card authorizations" or "Random Forrest using credit score histories." Selected server box 1406 may display a server ID assigned to the optimization task. For example, when optimization system hands the tasks to model generator 120, selected server box 1406 may display the selected server ID of model processor 340 (FIG. 3).

Status banner 1403 may include a plurality of buttons that allow a user to provide user instructions to optimization server. A pause button 1408 may allow a user of optimization server 1408 to pause the optimization process in selected tab 1402. In this way, if a user needs to release computing resources from optimization system 105, a user may request pausing the process with pause button 1408. In some embodiments, pause button 1408 may change to a different icon when activated and a user may send instructions to continue the process when a user selects pause button 1408 a second time. Restart button 1410 in interface 1400 may allow a user to request optimization system 105 to start again the optimization task. For example, if a user desires to reboot the process, the user may interact with restart button 1410 and send instructions to optimization system 105 to start a new optimization task. Terminate button 1412 in interface 1400 may allow the user to terminate the process and liberate any computer resources that are being used. For example, a user may consider the optimization process to be failed, that is, stuck in an endless iterative cycles. A user may send instructions to optimization system 105 to terminate the process using terminate button 1412.

Status banner 1403 may also include a process status box 1414. Process status box 1414 may display current tasks being performed by optimization system 105. For example, process status box 1414 may display messages such as "performing data profile" or "estimating minimum data requirements." In addition, status banner 1403 may include a progress bar 1416 that displays bar icon showing process of the overall optimization process.

Body section 1425 includes elements that may enable the user to transmit requests to optimization system 105 and receive information. Body section 1425 includes a data input 1416 including a data input field. Through the data input field the user may send a user dataset to optimization system 105. For example, using data input 1416 the user may point to the location in client devices 150 from which to retrieve a data file (e.g., a zip, xlsx, or csv) to be used as training data for the new model. Alternatively, or additionally, data input 1416 may allow a user to point out the location of a user dataset not in client devices 150. For example, using data input 1416 a user may specify an address in databases 180 from which optimization system 105 may retrieve the user data.

Body section 1425 may also include user parameter options 1418. In user parameters options 1418, a user may indicate desired options for the model that he wants to train. For example, a user may indicate through user parameter options 1418 whether hyper-parameters should be auto-tuned. Also, a user may specify user-selected hyper-parameters. Further, through user parameter options 1418, a user may specify the target accuracy or the allowed use of computer resources for the model. As shown in FIG. 14, in some embodiments, user parameter options 1418 may be implemented with a dropdown menu. For example, with user parameter options 1418 a user may select auto-tuned hyper-parameters or user-selected hyper-parameters. In addition, body section 1425 may include model type options 1420. As shown in FIG. 14, model type options 1420 may be implemented with radio buttons that allow the selection of one or more options for the model. Using model type options 1420, a user may specify the type of models that should be generated with the user dataset. For example, a user may select CNN, RNN, MPL, or linear regression, or multiple of these models.

Body section 1425 may also include start button 1422 that may be used to transmit the request to optimization system 105. In some embodiments, when a user interacts with start button 1422, data requirement estimation application 614 (FIG. 5) may generate a file that includes the user dataset, desired user parameters, and model type, and transmit it to optimization system 105. In such embodiments start button 1422 may be disabled until a user has inputted information in model type options 1420, user parameter options 1418, and data input 1416.

In some embodiments, body section 1425 may include a notifications box 1426. Notifications box 1426 may display alerts or messages transmitted from optimization system 105. For example, when optimization system 105 determines the user dataset is insufficient to reach the target accuracy for the selected model type, a message with the minimum number of samples for training and for validation may be displayed in notifications box 1426. Further, when optimization system 105 finds tentative hyper-parameters based on the dataset correlations, the sample hyper-parameters and values may be displayed in notification box 1426. Further, when a model is completed and ready for download, notifications box 1426 may display alert the user that the model is ready and display resulting hyper-parameters and estimated accuracy.

Body section 1425 may also include a download button 1428, which may become activated after optimization system 105 finalizes a model. In some embodiments, when a user interacts with download button 1428, the user may download the model to the client device 150. In other embodiments, when the user interacts with download button 1428, the user may receive parameters or hyper-parameters of the model in a data file.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system for determining data requirements to generate machine-learning models, comprising:
   one or more processors; and
   one or more storage devices storing instructions that, when executed, configure the one or more processors to perform operations comprising:
      receiving, from a database, a sample dataset comprising a plurality of samples;
      generating a plurality of data categories based on the sample dataset, the data categories being associated with category data profiles;
      for each of the data categories, generating a plurality of primary models using training data from the corresponding one of the data categories, the primary models comprising at least one convolutional neural network, at least one recurrent neural network, at least one multilayer perceptron, and at least one regression;
      for each of the primary models, generating a sequence of secondary models by training the corresponding one of the primary models with progressively less training data;
      identifying minimum viable models in the sequences of secondary models, the minimum viable models being models with a minimum amount of training data that achieve a threshold accuracy;
      determining a number of samples required for the minimum viable models by determining a number of samples required for training each of the minimum viable models and a number of samples required for validating each of the minimum viable models;
      generating a plurality of entries in the database, each of the plurality of entries comprising:
         a model type selected from convolutional neural network, recurrent neural network, multilayer perceptrons, or regression;
         a data category selected from the plurality of data categories; and
         a number of required training samples and a number of required validation samples corresponding to the number of samples required for one of the minimum viable models;
      receiving a model-training request from a client device, the request specifying:
         a target model type selected from convolutional neural network, recurrent neural network, multilayer perceptron, or regression; and
         a user dataset comprising a plurality of samples;
      generating a user data profile based on the user dataset;
      determining the data category most closely related to the user data profile, based on the category data profiles;
      in response to determining the data category most closely related to the user data, retrieving, from the database, a minimum number of samples for the user data profile based on:
         the category data profile most closely related to the user data profile, and
         the target model type; and
      generating a model of the target model type tailored for the user data profile using the minimum number of samples from the user dataset for training and validation.

2. The system of claim 1, wherein generating the model of the target model type comprises:
   determining whether the user dataset comprises a minimum number of samples;
   generating a user model of the target model type in response to determining the user dataset comprises the minimum number of samples; and
   generating a notification for the client device in response to determining the user dataset does not comprise the minimum number of samples, the notification specifying the minimum number of samples.

3. The system of claim 2, wherein:
   the user model is a first user model; and
   the operations further comprise generating a second user model by retraining the first user model with the user dataset completely, the second user model having the same hyper-parameters as the first user model.

4. The system of claim 1, wherein the threshold accuracy comprises an accuracy based on a predetermined threshold from the model training request.

5. The system of claim 1, wherein identifying the data category most closely related to the user data profile comprises:
   generating a user data vector based on the user data profile;
   generating category vectors based on the category data profiles; and
   selecting one of the data categories associated with one of the category vectors having a smallest distance to the user data vector as the data category most closely related to the user data profile.

6. The system of claim 1, wherein:
   the operations further comprise generating a web graphical user interface comprising:
      a data source input;
      a selector of type of model to be provided; and an option for dynamic selection of one of auto-tuned hyper-parameters or user-selected hyper-parameters; and receiving the model training request comprises receiving a model training request via the web interface.

7. The system of claim 1, wherein identifying the data category most closely related to the user data profile comprises:
generating a multi-dimensional user vector for the user data profile; and
generating multi-dimensional sample vectors for the category data profiles.

8. The system of claim 7, wherein identifying the data category most closely related to the user data profile further comprises:
determining centroids and key locations for each of the multi-dimensional user vectors and each of the multi-dimensional sample vectors;
calculating correlations between the key locations of the multi-dimensional user vector and centroids of the multi-dimensional sample vectors;
calculating Manhattan distances between the key locations of the multi-dimensional user vector and centroids of multi-dimensional samples vectors; and
determining a similarity score between the user data profile and the category data profiles, based on the calculated correlations and Manhattan distances.

9. The system of claim 1, wherein generating the data categories comprises sectioning the data based on credit card transactions originating merchant.

10. The system of claim 9, wherein none of the data categories share samples.

11. The system of claim 1, wherein determining the number of samples comprises:
determining effects of data variations on accuracy of the models; and
adjusting the number of samples based on the variations.

12. The system of claim 1, wherein generating sequences of secondary models comprises tuning hyper-parameters for each of the secondary models.

13. The system of claim 12, wherein tuning hyper-parameters comprises applying Bayesian optimization to each of the secondary models.

14. The system of claim 1, wherein
the samples comprise credit transactions associated with a plurality of users; and
the category data profiles comprise profiles determined by a period of transactions comprising daily, weekly, monthly, and yearly transactions.

15. The system of claim 14, wherein
inputs for each of the secondary models comprises credit information of a potential costumer; and
each of the secondary models generates an estimation of credit default as an output.

16. The system of claim 1, wherein:
generating the plurality of data categories comprises using a clustering technique comprising at least one of K-means or mixture of Gaussians;
the category data profiles are defined with particular periodic profiles comprising monthly, weekly, and daily transactions; and
generating the plurality of primary models comprises generating at least four models for monthly transactions, at least four models for weekly transactions, and at least four models for daily transactions.

17. The system of claim 1, wherein
receiving the model-training request comprises:
providing instructions to the client device to display a graphical user interface comprising:
a status banner; and
a body section comprising:
a data input field specifying the location of the user dataset;
parameter options indicating the target model type;
a notification box; and
a button configured to, when actuated, transmit the model-training request from the client device to the one more processors; and
the operations further comprise:
communicating the minimum number of samples to the client device in response to determining the button was actuated; and
providing instructions to the client device to display an alert, resulting hyper-parameters, and an estimated accuracy in the notification box.

18. The system of claim 1, wherein each of the plurality of entries further comprise:
tuned hyper-parameters that resulted in a highest accuracy; and
at least one of learning rate, number of epochs, batch size, activation function, or number of hidden layers used for the one of the minimum available models.

19. A non-transitory computer-readable medium storing instructions that, when executed by one or more processors, cause the one or more processors to perform operations comprising:
receiving, from a database, a sample dataset comprising a plurality of samples;
generating a plurality of data categories based on the sample dataset, the data categories being associated with category data profiles;
for each of the data categories, generating a plurality of primary models using training data from the corresponding one of the data categories, the primary models comprising at least one convolutional neural network, at least one recurrent neural network, at least one multilayer perceptron, and at least one regression;
for each of the primary models, generating a sequence of secondary models by training the corresponding one of the primary models with progressively less training data;
identifying minimum viable models in the sequences of secondary models, the minimum viable models being models with a minimum amount of training data that achieve a threshold accuracy;
determining a number of samples required for the minimum viable models by determining a number of samples required for training each of the minimum viable models and a number of samples required for validating each of the minimum viable models;
generating a plurality of entries in the database, each of the plurality of entries comprising:
a model type selected from convolutional neural network, recurrent neural network, multilayer perceptron, or regression;
a data category from the plurality of data categories; and
a number of required training samples and a number of required validation samples corresponding to the number of samples required for one of the minimum viable models;
receiving a model-training request from a client device, the request specifying:

a target model type selected from convolutional neural network, recurrent neural network, multilayer perceptron, or linear regression; and a user dataset comprising a plurality of samples;

generating a user data profile based on the user dataset;

determining the data category most closely related to the user data profile, based on the category data profiles;

in response to determining the data category most closely related to the user data, retrieving, from the database, a minimum number of samples for the user data profile based on:

the category data profile most closely related to the user data profile, and the target model type; and generating a model of the target model type tailored for the user data profile using the minimum number of samples from the user dataset for training and validation.

20. A computer-implemented method for determining data requirements to generate machine-learning models comprising:

receiving, from a database, a sample dataset comprising a plurality of samples;

generating a plurality of data categories based on the sample dataset, the data categories being associated with category data profiles;

for each of the data categories, generating a plurality of primary models using training data from the corresponding one of the data categories, the primary models comprising at least one convolutional neural network, at least one recurrent neural networks, at least one multilayer perceptrons, and at least one regression;

for each of the primary models, generating a sequence of secondary models by training the corresponding one of the primary models with progressively less training data;

identifying minimum viable models in the sequences of secondary models, the minimum viable models being models with a minimum amount of training data that achieve a threshold accuracy;

determining a number of samples required for the minimum viable models by determining a number of samples required for training each of the minimum viable models and a number of samples required for validating each of the minimum viable models;

generating a plurality of entries in the database, each of the plurality of entries comprising:

a model type selected from convolutional neural network, recurrent neural network, multilayer perceptron, or regression;

a data category from the plurality of data categories; and a number of required training samples and a number of required validation samples corresponding to the number of samples required for one of the minimum viable models;

receiving a model-training request from a client device, the request specifying:

a target model type selected from convolutional neural network, recurrent neural network, multilayer perceptron, or linear regression; and a user dataset comprising a plurality of samples;

generating a user data profile based on the user dataset;

determining the data category most closely related to the user data profile, based on the category data profiles;

in response to determining the data category most closely related to the user data, retrieving, from the database, a minimum number of samples for the user data profile based on:

the category data profile most closely related to the user data profile, and the target model type; and generating a model of the target model type tailored for the user data profile using the minimum number of samples from the user dataset for training and validation.

* * * * *